US011475153B2

(12) United States Patent
Pevzner

(10) Patent No.: US 11,475,153 B2
(45) Date of Patent: Oct. 18, 2022

(54) ONLINE PLATFORM FOR UNIQUE ITEMS

(71) Applicant: Godunov Enterprises, LLC, Jackson Heights, NY (US)

(72) Inventor: Boris Pevzner, Jackson Heights, NY (US)

(73) Assignee: Godunov Enterprises, LLC, Jackson Heights, NY (US)

( * ) Notice: Subject to any disclaimer, the term of this patent is extended or adjusted under 35 U.S.C. 154(b) by 0 days.

(21) Appl. No.: 17/197,846

(22) Filed: Mar. 10, 2021

(65) Prior Publication Data

US 2022/0229923 A1  Jul. 21, 2022

Related U.S. Application Data

(60) Provisional application No. 63/139,863, filed on Jan. 21, 2021.

(51) Int. Cl.
  *G06Q 10/10* (2012.01)
  *G06Q 30/06* (2012.01)
  (Continued)

(52) U.S. Cl.
  CPC ......... *G06F 21/6218* (2013.01); *G06N 20/00* (2019.01); *G06Q 30/0253* (2013.01); *G06Q 30/0283* (2013.01)

(58) Field of Classification Search
  CPC ........................... G06F 21/6218; G06N 20/00; G06Q 30/0253; G06Q 30/0283
  (Continued)

(56) References Cited

U.S. PATENT DOCUMENTS 5,911,131 A * 6/1999 Vig .................... G06Q 30/0278
  705/29
6,178,406 B1 * 1/2001 Cheetham ........ G06Q 10/06375
  705/7.34
(Continued)

OTHER PUBLICATIONS

Mathieu Aubry et al., Machine Learning, Human Experts, and the Valuation of Real Assets (Ctr. For Financial Studies, Working Paper No. 635, 2019), https://www.econstor.eu/bitstream/10419/206414/1/1680830031.pdf. (Year: 2019).*

(Continued)

*Primary Examiner* — Jonathan P Ouellette
(74) *Attorney, Agent, or Firm* — Fish & Richardson P.C.

(57) ABSTRACT

Among other things, a server controls access to private information about attributes of a unique item, during one or more stages of an online transaction for the unique item between a first online party and a second online party. The controlling of the access to the private information includes the server digitally storing (a) the private information, (b) a listing of the unique item for the online transaction received from the first online party, the listing including one or more constraints on access to the private information by the second online party at one or more stages of the online transaction, and (c) an indicator of a current stage of the one or more stages of the online sale transaction. The server allows or prevents access to the private information at one of the stages of the online transaction through a browser or an app installed on a device of the second online party and based on the current stage of the online transaction.

26 Claims, 49 Drawing Sheets

(51) Int. Cl.
*G06Q 10/06* (2012.01)
*G06Q 30/02* (2012.01)
*G06F 21/62* (2013.01)
*G06N 20/00* (2019.01)

(58) Field of Classification Search
USPC .......................................... 726/28; 705/1.1
See application file for complete search history.

(56) References Cited

U.S. PATENT DOCUMENTS

| | | | | |
|---|---|---|---|---|
| 7,263,504 | B2* | 8/2007 | Galai | G06Q 40/00 |
| | | | | 705/35 |
| 8,315,918 | B1* | 11/2012 | Karonis | G06Q 40/04 |
| | | | | 705/26.3 |
| 9,495,386 | B2* | 11/2016 | Tapley | G06Q 30/0623 |
| 9,703,857 | B2* | 7/2017 | Glimcher | G06F 21/6218 |
| 10,242,035 | B1* | 3/2019 | Asman | G06K 9/6271 |
| 2004/0044596 | A1* | 3/2004 | Franks | G06Q 50/10 |
| | | | | 705/28 |
| 2005/0165650 | A1* | 7/2005 | Kothapalli | G06Q 30/08 |
| | | | | 705/26.3 |
| 2005/0216360 | A1* | 9/2005 | Osterer | G06Q 30/06 |
| | | | | 705/26.1 |
| 2006/0184443 | A1* | 8/2006 | Erez | G06Q 40/04 |
| | | | | 705/37 |
| 2008/0004977 | A1* | 1/2008 | Fisher | G06Q 30/08 |
| | | | | 705/26.3 |
| 2010/0223156 | A1* | 9/2010 | Shii | G06Q 30/0641 |
| | | | | 705/26.1 |
| 2011/0022542 | A1* | 1/2011 | Lutnick | G06Q 40/04 |
| | | | | 705/36 R |
| 2012/0066072 | A1* | 3/2012 | Kanigsberg | G06F 16/9535 |
| | | | | 705/14.66 |
| 2012/0084169 | A1* | 4/2012 | Adair | G06Q 30/08 |
| | | | | 705/26.3 |
| 2012/0296677 | A1* | 11/2012 | Ulka | G06Q 10/083 |
| | | | | 705/4 |
| 2013/0041721 | A1* | 2/2013 | Neuendorf | G06Q 40/06 |
| | | | | 705/7.35 |
| 2013/0124356 | A1* | 5/2013 | Bhogal | G06Q 30/08 |
| | | | | 705/26.3 |
| 2014/0143080 | A1* | 5/2014 | Kelman | G06Q 30/08 |
| | | | | 705/26.3 |
| 2014/0279395 | A1* | 9/2014 | Quinlan | G06Q 40/025 |
| | | | | 705/38 |
| 2015/0120580 | A1* | 4/2015 | Pabst | G06Q 30/02 |
| | | | | 705/306 |
| 2015/0269682 | A1* | 9/2015 | Kontilai | G06Q 30/0609 |
| | | | | 705/4 |
| 2015/0269691 | A1* | 9/2015 | Bar Yacov | G06F 16/3334 |
| | | | | 705/311 |
| 2016/0189210 | A1* | 6/2016 | Lacey | G06N 7/005 |
| | | | | 705/7.31 |
| 2018/0330432 | A1* | 11/2018 | Mazor | G06Q 20/12 |
| 2020/0057815 | A1* | 2/2020 | Powers | G06F 16/9535 |
| 2021/0082051 | A1* | 3/2021 | Moses | G06F 9/451 |

OTHER PUBLICATIONS

Jianping Mei & Michael Moses, Beautiful Asset: Art as Investment, 7 J. Investment Consulting (2005). (Year: 2005).*

Adriano Pincinati di Torcello, Why Should Art Be Considered as an Asset Class?, Deloitte, May 9, 2016, https://www2.deloitte.com/content/dam/Deloitte/lu/Documents/financial-services/artandfinance/lu-art-asset-class-122012.pdf (Year: 2016).*

Artprice, "Artprice Indicator Methodology," Feb. 2, 2015. https://www.artprice.com/indicator/howto. (Year: 2015).*

Sophie Haigney, "Wondering Who Did That Painting? There's an App (or Two) for That," N.Y. Times, Sep. 11, 2019, https://www.nytimes.com/2019/09/11/arts/design/smartphone-art-app.html. (Year: 2019).*

Tristan Post, "What Is a Painting Worth?" Medium. Jul. 5, 2020. https://medium.com/@tristan.s.b.post/what-is-a-painting-worth-dfbae37c108d. (Year: 2020).*

William Goetzman et. al., "The Economics of Aesthetics and Three Centuries of Art Price Records." Aug. 2014. https://www.nber.org/system/files/working_papers/w20440/w20440.pdf. (Year: 2014).*

Magnus, "FAQ," Jun. 10, 2020, http://www.magnus.net/faq/. (Year: 2020).*

Jason Bailey, Can Machine Learning Predict the Price or Art at Auction?, Harvard Data Science Review, Apr. 30, 2020, https://hdsr.mitpress.mit.edu/pub/ 1vdc2z91/release/2. (Year: 2020).*

Rafi Ayub et. al., "Art Appraisal Using Convolutional Neural Networks," Dec. 15, 2017, http://cs229.stanford.edu/proj2017/final-reports/5229686.pdf. (Year: 2017).*

17197846 EIC 3600 Search Report Jun. 10, 2021 (Year: 2021).*

Apps.apple.com [online], "Coin", published in 2018, retrieved on Mar. 8, 2021, retrieved from URL<https://apps.apple.com/us/app/coin-discover-buy-sell/id1303652712>, 2 pages.

Apps.apple.com [online], "Coinbase", published on or before Mar. 8, 2021, retrieved on Mar. 9, 2021, retrieved from URL<https://apps.apple.com/us/app/coinbase-buy-sell-bitcoin/id886427730>, 4 pages.

Apps.apple.com [online], "Globalartsale", published in 2019, retrieved on Mar. 8, 2021, retrieved from URL<https://apps.apple.com/us/app/globalartsale/id1437993830>, 3 pages.

Apps.apple.com [online], "OneGold: Buy Precious Metals", published on or before Mar. 8, 2021, retrieved on Mar. 9, 2021, retrieved from URL<https://apps.apple.com/gb/app/onegold/id1491393914>, 2 pages.

Artbnk.com [online], "Discover the Beauty of Accurate Valuations", published in 2020, retrieved on Mar. 8, 2021, retrieved from URL<https://www.artbnk.com/how-it-works>, 9 pages.

Artcollection.io [online], "Effortless organization for your art collection", published on or before Mar. 8, 2021, retrieved on Mar. 9, 2021, retrieved from URL< https://artcollection.io/>, 10 pages.

Artdeal.com [online], "Hi. I'm ArtDeal.", published on or before Mar. 8, 2021, retrieved on Mar. 9, 2021, retrieved from URL<https://artdeal.ai/about>, 1 page.

Articker.net [online], "Welcome to the Art World's Analytics Engine", published on or before Mar. 8, 2021, retrieved on Mar. 8, 2021, retrieved from URL<https://articker.net/static/login>, 1 page.

Artmarq.com [online], "Artmarq is data-driven approach for the art market", published on or before Mar. 8, 2021, retrieved on Mar. 8, 2021, retrieved from URL<https://www.artmarq.com/>, 6 pages.

Artnet.com [online], "artnet", published on or before Mar. 8, 2021, retrieved on Mar. 8, 2021, retrieved from URL<http://www.artnet.com/>, 8 pages.

Artprice.com [online], "The Art Markets Prices and Images", published on or before Mar. 8, 2021, retrieved on Mar. 8, 2021, retrieved from URL<https://www.artprice.com/>, 3 pages.

Artpro.com [online], "Your best art consultant", published on or before Mar. 8, 2021, retrieved on Mar. 8, 2021, retrieved from URL<https://artpro.com/>, 4 pages.

ArtsandCulture.google.com [online], "Celebrate Women in Culture", published on or before Mar. 8, 2021, retrieved on Mar. 8, 2021, retrieved from URL<https://artsandculture.google.com/>, 1 pages.

Artstaq.com [online], "Artstaq Glossary", published on or before Mar. 8, 2021, retrieved on Mar. 8, 2021, retrieved from URL<https://www.artstaq.com/glossary/aqra/>, 1 pages.

Artsy.net [online], "Artsy", published on or before Mar. 8, 2021, retrieved on Mar. 8, 2021, retrieved from URL<https://www.artsy.net/>, 6 pages.

ArtTactic.com [online], "Art market research & analysis for the fast changing art world", published on or before Mar. 8, 2021, retrieved on Mar. 8, 2021, retrieved from URL<https://arttactic.com/>, 4 pages.

Backlotcars.com [online], "Fresh Trades at Your Fingertips", published in 2020, retrieved on Mar. 8, 2021, retrieved from URL<https://backlotcars.com/>, 9 pages.

(56) References Cited

OTHER PUBLICATIONS

Barnebys.com [online], "Your search for art, design, antiques, and collectibles starts here", published on or before Mar. 8, 2021, retrieved on Mar. 9, 2021, retrieved from URL<https://www.barnebys.com/>, 13 pages.
Christies.com [online], "Contemporary Art at Christies New York", published on or before Mar. 8, 2021, retrieved on Mar. 8, 2021, retrieved from URL<https://www.christies.com/>, 10 pages.
Chrono24.com [online], published on or before Mar. 8, 2021, retrieved on Mar. 8, 2021, retrieved from URL<https://www.chrono24.com/>, 10 pages.
Collectoriq.com [online], "Collect Wisely", published on or before Mar. 8, 2021, retrieved on Mar. 9, 2021, retrieved from URL<https://collectoriq.com/>, 5 pages.
Farfetch.com [online], "Farfetch", published on or before Mar. 8, 2021, retrieved on Mar. 8, 2021, retrieved from URL<https://www.farfetch.com/>, 3 pages.
Freightfriend.com [online], "Build Relationships, Then Automate", published on or before Mar. 8, 2021, retrieved on Mar. 9, 2021, retrieved from URL<https://www.freightfriend.net/>, 6 pages.
Idonowidont.com [online], "Buy wisely, sell wisely", published on or before Mar. 8, 2021, retrieved on Mar. 8, 2021, retrieved from URL<https://www.idonowidont.com/?gclid=EAIaIQobChMIwOyBmNjl7QIVjZyGCh0SsgkvEAMYASAAEgKGm_D_BwE>, 6 pages.
Lemonade.com [online], "Forget everything you know about insurance", published on or before Mar. 8, 2021, retrieved on Mar. 9, 2021, retrieved from URL<https://www.lemonade.com/de/en>, 6 pages.
Liveauctionart.com [online], "Real-time Auction Results Anywhere and Anytime", published on or before Mar. 8, 2021, retrieved on Mar. 9, 2021, retrieved from URL<https://www.liveauctionart.com/>, 4 pages.
Liv-Ex.com [online], "The smartest way to price, buy and sell wine", published on or before Mar. 8, 2021, retrieved on Mar. 8, 2021, retrieved from URL<https://www.liv-ex.com/>.
Lobus.io [online], "The all-in-one art platform built on easy access to data", published in 2020, retrieved on Mar. 8, 2021, retrieved from URL<https://lobus.io/>, 4 pages.
Masterworks.io [online], "You're invited to join an exclusive community investing in blue-chip art", published on or before Mar. 8, 2021, retrieved on Mar. 8, 2021, retrieved from URL<https://www.masterworks.io/>, 7 pages.
Moma.org [online], "There's nothing like being here", published on or before Mar. 8, 2021, retrieved on Mar. 8, 2021, retrieved from URL<https://www.moma.org/>, 25 pages.
OTCTrade.com [online], "Set up your own KYC/AML-compliant OTC Desk", published on or before Mar. 8, 2021, retrieved on Mar. 9, 2021, retrieved from URL<https://otctrade.com/>, 11 pages.
Parade.ai [online], "Capacity Management for Digital Freight Brokerage Teams", published on or before Mar. 8, 2021, retrieved on Mar. 9, 2021, retrieved from URL<https://www.parade.ai/>, 9 pages.
Perfectchannel.com [online], "North American Digital Cattle Market", published on or before Mar. 8, 2021, retrieved on Mar. 9, 2021, retrieved from URL <https://www.perfectchannel.com/case-studies/north-american-digital-cattle-market/>, 5 pages.
Perfectchannel.com [online], "Transforming Luxury Auctions", published on or before Mar. 8, 2021, retrieved on Mar. 9, 2021, retrieved from URL<https://www.perfectchannel.com/case-studies/transforming-luxury-auctions/?doing_wp_cron=1615318391.2440121173858642578125>, 6 pages.
Phillips.com [online], "Phillips", published on or before Mar. 8, 2021, retrieved on Mar. 8, 2021, retrieved from URL<https://www.phillips.com/>, 11 pages.
Pi-ex.co [online], "Track the art market on a monthly basis with Pi-eX auction market index Pi-eX AMI", published on or before Mar. 8, 2021, retrieved on Mar. 8, 2021, retrieved from URL<https://pi-ex.co/>, 2 pages.
Sothebys.com [online], "Sothebys", published on or before Mar. 8, 2021, retrieved on Mar. 8, 2021, retrieved from URL<https://www.sothebys.com/en/>, 7 pages.
Sothebys.com [online], "The Sothebys Mei Moses Indices", published on or before Mar. 8, 2021, retrieved on Mar. 8, 2021, retrieved from URL<https://www.sothebys.com/en/the-sothebys-mei-moses-indices>, 5 pages.
Stocktwits.com [online], "See whats happening now in the markets", published on or before Mar. 8, 2021, retrieved on Mar. 9, 2021, retrieved from URL<https://stocktwits.com/>, 3 pages.
Stockx.com [online], "The Stock Market for Things", published on or before Mar. 8, 2021, retrieved on Mar. 8, 2021, retrieved from URL<https://stockx.com/how-it-works>, 4 pages.
Tate.org.uk [online], "See more as a member", published on or before Mar. 8, 2021, retrieved on Mar. 8, 2021, retrieved from URL<https://www.tate.org.uk/>, 11 pages.
Test.Globalartsale.com [online], published on or before Mar. 8, 2021, retrieved on Mar. 8, 2021, retrieved from URL<https://test.globalartsale.com/>, 5 pages.
Therealreal.com [online], "About Real Real", published on or before Mar. 8, 2021, retrieved on Mar. 8, 2021, retrieved from URL<https://www.therealreal.com/about>, 9 pages.
Vendiapp.com [online], "Shop your new phone sustainability", published in 2020, retrieved on Mar. 8, 2021, retrieved from URL<https://vendiapp.com/>, 26 pages.
Winemarketjournal.com [online], "Quarterly Indices", published on or before Mar. 8, 2021, retrieved on Mar. 8, 2021, retrieved from URL<https://www.winemarketjournal.com/>, 2 pages.

* cited by examiner

Artworks

Filters: ⌄ Medium   ⌄ Live Art Estimate   ⌄ Auction Sales   ⌄ Other       Sort by: Featured ⌄

Jean-Michel Basquiat
Desmond, 1984
$2,900,000 - 3,240,000
△ 1.9% last year
Buy Similar ♡ ⤴

Jean-Michel Basquiat
59 Homers, 1982
$2,900,000 - 3,240,000
△ 0.4% last year
Buy Similar ♡ ⤴

Jean-Michel Basquiat
Untitled (Per Capita); Untitled (Head); Untitled (Ernok); and Untitled (Rinso), 1983
$2,900,000 - 3,240,000
▽ 1.6% last year
Buy Similar ♡ ⤴

Jean-Michel Basquiat
Venus, 1982
$2,900,000 - 3,240,000
△ 3.8% last year
Buy Similar ♡ ⤴

Jean-Michel Basquiat
2 half hours of Chinese food, 1984
$2,900,000 - 3,240,000
△ 1.5% last year
Buy Similar ♡ ⤴

Jean-Michel Basquiat
Sans titre, 1982
$2,900,000 - 3,240,000
▽ 2.8% last year
Buy Similar ♡ ⤴

Jean-Michel Basquiat
Untitled (Anatomy), 1982
$2,900,000 - 3,240,000
△ 1.3% last year
Buy Similar ♡ ⤴

Jean-Michel Basquiat
Untitled, 1981
$2,900,000 - 3,240,000
△ 0.1% last year
Buy Similar ♡ ⤴

Search by artist or artwork title...

My deals
ALL BUYING SELLING COMPLETED

MARKET DEAL ROOM (2) WISHLIST (6) MY COLLECTION ACCOUNT | SELL ARTWORK

BUYING — 198

Image is hidden

Title is hidden
Jean-Michel Basquiat $56,000-60,000
↘ 1.9% per last year — 204

— 202

196

Request for permission to view artwork details has been sent
The seller must accept or reject your application within 24 hours.

⊗ Anonymous owner ☆☆☆☆☆
KYC verified | You traded — 206

Revoke request   Time left 10:01

SOLD On 24 July 2020
Mini us open 2, 1977
Jonas Wood

○——○ Money has been transferred to your account $68,000 → $65,000

View details

— 208

BOUGHT On 20 Jul 2020
Self portrait, 2001
The Bruce High Quality Foundation

○——○ Will be delivered soon $60,000

View details

Step 1  Step 2  Step 3
Artwork details  Set sale settings  List

Upload new artwork

219

Artist name

| Jonas Wood | + Add new artist |

Tittle

| Mini us open 2 |

Year created

| 1991 |

Medium

| Painting ▼ |

Value estimation $63,000 - 68,000    How is the value estimated ?

↘1.9 % per last year

220

30k
0

| View analytics |

Materials

| Oil, Acrylic ▼ |

Signature

○ Yes  ● No  ○ Unknown

Dimensions

● Centimeters  ○ Inches

| 45.7 cm | | 45.7 cm | | Depth, cm |

Edition size (optional)

| For example 50 |

Note (optional)

| Type notes here... |

FIG. 10A

Additional information (optional)

Required in case of sale

↗ 222

Condition

| Good ▼ |

Damage

| Select ▼ |

Framing

| Framed ▼ |

Location

| Country or city where the artwork is located ⊕ |

Provenance                                    Add +

Sales information                             Add +

↗ 224

Verification (optional)

Highly recommended in case of sale

Ownership, valuation and authenticity documentation

⤒ Upload documents here (LA)  You can increase the number of responses
      to your listing by verifying artwork.

Sales assistant

Note (optional)

[Type notes here...]

Additional information (optional)

Required in case of sale

Condition

[Good ▼] ← 223

Damage

[ ▼] ← 222

Framing

[Framed ▼]

Location

[Country or city where the artwork is located ⊙]

Provenance                                Add +

---

Sales information                         Add +

---

Verification (optional)

Highly recommended in case of sale

Ownership, valuation and authenticity documentation

> ⬆ Upload documents here
>
> (LA)  You can increase the number of responses
>       to your listing by verifying artwork.
>
>       Sales assistant

Additional information (optional)

Required in case of sale

Condition

| Select ▲ |
|---|
| Pristine <br> Absolutely no damage to artwork surface |
| Excellent <br> Minor flaws or damage to artwork surface, visible only under close inspection in specular or raking light |
| Very Good <br> Minor flaws or damage to artwork surface, visible upon inspection under standard gallery lighting conditions |
| Good <br> Flaws or damage that draws the eye under normal viewing conditions once known or seen |
| Fair <br> Flaws or damage immediately apparent under normal viewing conditions |
| Poor <br> Shipping with broken glass, folded, oil rags... |

← 224

Verification (optional)

Highly recommended in case of sale

Ownership, valuation and authenticity documentation

 Upload documents here

 You can increase the number of responses to your listing by verifying artwork.

Sales assistant

○ Market
  Sell at a market price that we calculate
○ Offer
  Let the buyers offer you a price

Offers from buyers　　　　　　　　／‾242
● Enable ○ Disable

> You will receive offers to reduce the price and will be able to make counter-offers.

Visibillity
● Everyone　　　　　　　　　　　　／‾244
○ Restricted
　　⬭ LiveArt users
　　⬭ with score no less than　① ② ③ ④
○ By invite 247
Privacy　　／
○ Public, all parameters visible　　[RECOMMENDED] ◄—246
● Private, only some parameters visible > Interested users will have to request permission from you to view the details of the artwork.
>
> What parameters will be initially hidden?
> - Artwork picture
> - Artwork title
> - Artwork description
> - Sales history
>
> Show how other users see artwork
>
> (LA) We recommend that you allow all users to view details to increases your audience reach
>
> Sales assistant

My deals
ALL   BUYING   SELLING   COMPLETED

[SALE] 1 minute on sale
Mini us open 2, 1977
Jonas Wood
Offers on
Data: hidden

Est. $63,000-68,000
$68,000
↗ 1.9% per last year
Unlist this item

Request to see the details of the painting
You must reply within 24 hours
⊗ Anonymus Coat-of-arms ☆☆☆☆
KYC verified | Verified collection | You traded | You approved them
[Allow]  [Decline]
Time left 05:01

— 274

[BOUGHT] On 20 Jul 2020
Self portrait, 2001
The Bruce High Quality Foundation
○—○—○ Will be delivered soon $60,000
View details

FIG. 21

My deals
ALL  BUYING  SELLING  COMPLETED

[SALE] 1 minute on sale
Mini us open 2, 1977
Jonas Wood
Offers on
Data: hidden $68,000
Est. $63,000-68,000
↗ 1.9% per last year
Unlist this item View list of users — 276

1 users can view artwork data — 277

[BOUGHT] On 20 Jul 2020
Self portrait, 2001
The Bruce High Quality Foundation
o—o—○ Will be delivered soon $60,000

View details

FIG. 22

My deals

ALL  BUYING  SELLING  COMPLETED

---

[SALE] 1 minute on sale
Mini us open 2, 1977
Jonas Wood
Offers on
Data: hidden $68,000
Est. $63,000-68,000
↗ 1.9% per last year
Unlist this item 10 users can view artwork data    View list of users offer — 291
You must reply within 24 hours
⊗ Anonymus Coat-of-arms ★★★★☆
KYC verified | Verified collection | You traded | You approved them $68,000 → $65,000
Time left 05:01

[Sell]  [Counter offer]  [Dismiss]
       293

[BOUGHT] On 20 Jul 2020
Self portrait, 2001
The Bruce High Quality Foundation $60,000

○—○—○ Will be delivered soon    View details

FIG. 23

My deals

ALL  BUYING  SELLING  COMPLETED

[SALE] 1 minute on sale
Mini us open 2, 1977
Jonas Wood
Offers on
Data: hidden $68,000
Est. $63,000-68,000
↗1.9% per last year
Unlist this item 10 users can view artwork data          View list of users Counter offer was declined                    $66,500→$65,000
You can sell for the initial offer price ⊗ Anonymus Coat-of-arms ☆☆☆☆☆
KYC verified | Verified collection | You have already dealt with the user
                                                                    Time left 05:01

[Sell]  [Dismiss]

— 292

— 297

[BOUGHT] On 20 Jul 2020
Self portrait, 2001
The Bruce High Quality Foundation $60,000 o—o—o Will be delivered soon          View details

My deals
ALL BUYING SELLING COMPLETED

BUYING
Untitled (Ernok), 1970 - 1988
Jean-Michel Basquiat $58,000
Est. $56,000 - 60,000
↗ 1.9% per last year You sent price offer
Owner must respond to your offer price within 24 hours.

$58,000

⊗ Anonymus owner ☆☆☆☆☆
KYC verified | You traded

Time left 10:01

282

SOLD On 24 Jul 2020
Mini us open 2, 1977
Jonas Wood $65,000

○——○——○ Money has been transferred to your account   View details

BOUGHT On 20 Jul 2020
Self portrait, 2001
The Bruce High Quality Foundation $60,000

○——○——○ Will be delivered soon   View details

FIG. 32

My deals
ALL BUYING SELLING COMPLETED

BUYING
Untitled (Ernok), 1970 - 1988
Jean-Michel Basquiat $58,000
Est. $56,000 - 60,000
↘1.9% per last year Countoffer from owner
Your offer price of $58,000 was rejected.
⊗ Anonymus owner ☆☆☆☆☆
KYC verified | You traded $58,000→$60,000 —284

Time left 10:01

[Buy] [Dismiss]

SOLD On 24 Jul 2020
Mini us open 2, 1977
Jonas Wood $65,000

○——○——○——○——○ Money has been transferred to your account    View details

BOUGHT On 20 Jul 2020
Self portrait, 2001
The Bruce High Quality Foundation $60,000

○——○——○——○ Will be delivered soon    View details

DETAILS & CATALOGUING

Jean-Michel Basquiat
1960 - 1988
*UNTITLED (PER CAPITA)*

Executed in 1983-2001, this work is number 14 from an edition of 85 plus 15 AP, published by DeSanctis Carr Fine Art. numbered 14/85 by the executor of the artist's estate, Gerard Basquiat; signed and dated 11-19.01 on the estate's label affixed to the reverse screenprint in colours
101 by 101.5 cm., 39 3/4 by 40 in.

READ CONDITION REPORT

SALEROOM NOTICE

PROVENANCE

Collectors Contemporary. Singapore
Acquired from the above by the present owner

ADD TO MY CATAL
FOLLOW LOT
PRINT

BOUND CONTE ART
11 JUNE 2015
HONG KONG
CONTACT INFO

◇ This Artwork   ◎ Similar Artwork
　　　⊕ Sales of Others

Sales of this Artwork — 324

| Title | Per Capita, 1983/2001 |
| Last Sale Date | November 3, 2014 |
| Edition No. | 18 |
| Last Price Sold | $65,000 |

Follow Us

SUPPORT
Contact Us
FAQ

CORPORATE
Press
Privacy Policy
Corporate Governance

MORE...
Security
Terms & Conditions
Modern Slavery Stateme

FIG. 37 (Cont.)

ONLINE PLATFORM FOR UNIQUE ITEMS

CLAIM OF PRIORITY

This application claims the benefit of U.S. Provisional Application Ser. No. 63/139,863, filed on Jan. 21, 2021. The entire contents of the foregoing are incorporated herein by reference.

BACKGROUND

This description relates to an online platform for unique items.

In a typical market (physical or online) buyers and sellers and other participants engage in a range of market activities. The activities can include meeting one another, making items available for sale, discovering listed items of interest for sale, acquiring information about the items, negotiating prices and terms of sale transactions, transacting, and using related services (for example, financing, insurance, and logistics services).

Typical online markets enable participants to engage in market activities entirely or partially online. In online markets, the listed items can be unique items (e.g., one-of-a-kind) or fungible items. On Amazon, for example, many of the listed items are fungible, while many listed items on eBay are unique items. A stock exchange provides a platform for transactions in, for example, fungible equity shares in particular companies.

Items are normally made available or presented on online markets using market listings. The listings can be transparent listings that openly reveal prices and attributes of the listed items (such as for fungible items), or opaque listings that hide prices and sometimes other information about the listed items. A listing on Priceline's name-your-own-price service for hotel rooms and airfares, for example, is an opaque listing in that the price offered by the seller is hidden from the buyer.

In some markets, relying on a transparent listing can lead to a depreciation in the price at which the listed item can be sold. For example, in an art market, an artwork that does not sell after being displayed for a period of time may be considered "burned", which impairs its price, sometimes considerably.

In addition, use of a transparent listing may reduce the seller's (e.g., owner's) ability to maintain privacy. For example, it is often possible to trace an artwork to its seller or owner based on a description or image of the artwork presented in a market, and some sellers or owners find this transparency objectionable.

Some markets for unique items (notably art markets) are opaque markets carrying opaque listings for which offering prices and other information and access to artworks are withheld and controlled by a small group of intermediaries (insiders) operating between sellers and buyers. Such opaque markets can be more or less inaccessible to the public and can be inefficient in establishing prices in sales of listed items that represent the true values of the items.

SUMMARY

In general, in an aspect of the invention, a server controls access to private information about attributes of a unique item, during one or more stages of an online transaction for the unique item between a first online party and a second online party. The controlling of the access to the private information includes the server digitally storing (a) the private information, (b) a listing of the unique item for the online transaction received from the first online party, the listing including one or more constraints on access to the private information by the second online party at one or more stages of the online transaction, and (c) an indicator of a current stage of the one or more stages of the online sale transaction. The server allows or prevents access to the private information at one of the stages of the online transaction through a browser or an app installed on a device of the second online party and based on the current stage of the online transaction.

Implementations can include one or a combination of two or more of the following features. The controlling of the access to the private information includes the server receiving a request of the second online party for at least part of the private information and making a determination to permit or deny access to the private information by the second online party. The controlling of the access to the private information includes forwarding the request of the second online party to the first online party and receiving an instruction from the first online party to permit or deny access. The one of the stages at which the access is allowed or prevented is a stage prior to a commitment to the online transaction by the first online party and the second online party. The unique online item includes a unique artwork. The private attributes are one or more of: a depiction of the unique item, a name of the unique item, or an identity of an owner of the unique item. The online transaction includes a sale transaction. The first online party includes a seller of the unique item and the second online party includes a buyer of the unique item. The server updates the stored indicator of the current stage to reflect progress in the one or more stages of the online transaction. The server updates the one or more constraints based on the instruction from the first online party.

In general, in an aspect, a server raises a level of interest of an online party in engaging in possible online transactions with respect to one or more target unique objects, the target unique objects being available for the online transactions. The raising of the level of interest includes the server storing records for a catalog of unique objects including the target unique objects and other unique objects. The server executes a process to select a set of unique objects from the catalog based on information about the online party and information about the unique objects in the catalog. The selected set includes at least one of the other unique objects and does not necessarily include any of the one or more target unique objects. The server presents to the online party in a user interface of a browser or an app installed on a device of the online party, information from records for the selected set of unique objects. The server selects an updated set of unique objects based on actions of the online party in the user interface after the information is presented to the online party. The actions of the online party reflect a level of interest of the online part in engaging in the online transactions. The presenting action and the updating action are repeated until the updated set of unique objects includes at least one of the target unique objects.

Implementations can include one or a combination of two or more of the following features. The target unique objects are subject to offers by another online party. The storing of records for the catalog includes storing attributes for the unique objects. The executing of the process to select the set of unique objects is based on the attributes stored in the catalog. The attributes include estimated prices. The presenting of information from records for the selected set of unique objects includes presenting a navigable gallery of the unique objects. The actions of the online party include indications of interest in one or more of the unique objects in the gallery. The unique objects include artworks. The target unique objects include artworks that are offered for an online sale transaction. The other unique objects include artworks that are not offered for an online sale transaction. The raising of the level of interest includes changing a scope of interest from an interest in browsing to an interest in buying one of the artworks that are offered for an online sale transaction.

In general, in an aspect, a server directs an iterative process of online navigation by a user, of an imaginary multi-dimensional space of unique items. The unique items are part of a catalog of attributes of the unique items maintained by the server. The unique items include one or more special unique items which are a target of the directing of the iterative process of online navigation by the user. The directing of the iterative process includes presenting a first set of the unique items to a user through a browser or an app installed on a device of the user. The first set of unique items does not necessarily include any of the special unique items. References made by the user to one or more of the presented unique items are received. The references are indicative of a subspace of the multi-dimensional space. In response to the received references, an updated set of the presented unique items is formed corresponding to the indicated subspace and the updated set of unique items is presented. The actions of receiving the references and forming the updated set are iterated so that the updated set eventually includes one or more of the special unique items that are presented through the browser or the app.

Implementations can include one or a combination of two or more of the following features. The special unique objects are subject to offers. The presenting of the unique items includes presenting a navigable gallery of entries. Each of the entries corresponds to one of the unique objects. When the updated set includes one or more of the special unique items, the special unique items are identified to the user. The unique objects include artworks. The special unique objects include artworks that are offered for an online sale transaction.

In general, in an aspect, a server generates estimates of current values of arbitrarily identified unique objects of a class of unique objects. The generating of the estimates includes the server storing a catalog of records of unique objects of the class. The records contain information about attributes of the unique objects. At least one of the attributes is known values of at least some of the unique objects. The server trains a model to be predictive of a current value of a unique object based at least on information about attributes of the unique object. The training is based on the stored records of the unique objects in the catalog. The server applies the trained model to the arbitrarily identified unique objects of the class of unique objects to generate estimates of current values of the arbitrarily identified unique objects.

Implementations can include one or a combination of two or more of the following features. The estimates of the current values include prices or ranges of prices at which the unique objects would be expected to sell. The class of unique objects includes a class of artworks. The known values of at least some of the unique objects include historical values in sale transactions. The training is based on attributes of the unique item in addition to known values of the unique items. The training is based also on information about external parameters that affect the values of two or more of the unique items.

In general, in an aspect, with respect to a presentation of a page from a first source by an app or a browser installed on a mobile device, an identification process is executed to identify a unique item being presented on the page. The page is from a first source. The identification process is supplemental to the app or to the browser. With respect to the unique item identified on the page, a presentation process is executed to present supplemental information about the unique item. The supplemental information has been obtained from a second source independent of the first source.

Implementations can include one or a combination of two or more of the following features. The identifying of the unique item includes parsing text of the page from the first source. The identifying of the unique item includes comparing the parsed text to information about unique items known to the second source. The unique item includes a creative work and the information known to the second source includes information about a creator of the work or a title of the work. The supplemental information includes bibliographic information. The supplemental information includes value performance information. The supplemental information includes one or more invocable controls. The invocation of the invocable controls causes navigation to a page hosted by the second source. The page hosted by the second source presents information about additional unique items similar to the identified unique item. The identification process and the presentation process are part of a browser extension. The presentation of the supplemental information includes at least two different states which present two different amounts of supplemental information.

In general, in an aspect, a server stores a catalog of attributes of artworks. The catalog includes entries of attributes of the artworks. The attributes include value performance attributes, images of the artworks, and artists of the artworks. The server serves pages of an enhanced online market for artworks through user interfaces of apps or browsers installed on one or more devices of participants. The server uses attributes of the artworks and information external to the stored catalog to include in the served pages (a) a gallery of artists of the artworks including value performances of artworks of the artists, (b) graphical value performance information for one or more genres or eras to which the artworks below, and (c) a gallery of artworks. The gallery includes entries each including value performance of the corresponding artwork. The server includes in the served pages controls to be invoked by a user of the enhanced online market for artworks. The controls enable a user to explore (a) the catalog by invoking depictions of the artworks in the gallery of artworks iteratively, and (b) value performance information for each of the artworks, each of the artists, and each of the genres. The value performance information includes estimated current prices.

Implementations can include one or a combination of two or more of the following features. The server applies a trained predictive model to artworks in the gallery to produce estimated current prices to be included in the served pages. The server includes in the served pages controls to be invoked by a user to engage in a sale transaction for one of the artworks as a buyer or a seller. The claim includes the server enabling a seller to control privacy of private information in connection with a sale transaction.

Among the advantages of one or more of these aspects are the following. Both seasoned and aspiring market participants have access to useful or necessary data, insight, and opportunity to buy, sell or hold without relying on traditional intermediaries. And the inherent illiquidity of the market for unique items is addressed by providing buyer participants and seller participants at all levels with real-time information and an efficient and secure market in which to transact.

These and other aspects, features, implementations, and advantages (a) can be expressed as methods, apparatus, systems, components, program products, business methods, means or steps for performing functions, and in other ways, and (b) will become apparent from the following description and from the claims.

DESCRIPTION

FIGS. 1A through 37 and 40 are screen shots of user interfaces of enhanced online markets for unique items.

Figure 1A:
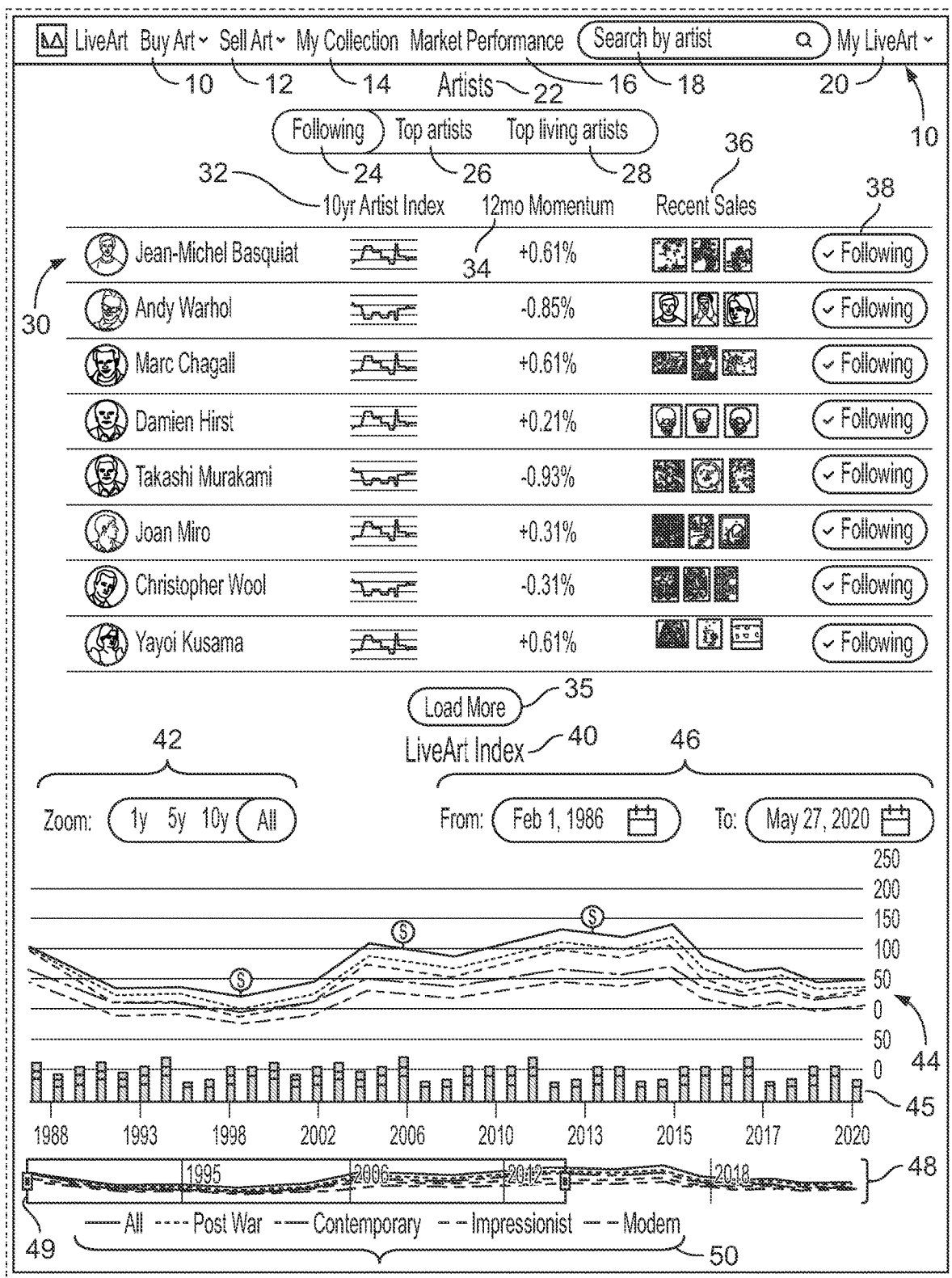

Here we describe an enhanced online market technology that implements enhanced online markets for unique items. Although some of the description relates to an example of an enhanced online art market technology and to an enhanced online market for artworks, the description is applicable to a wide variety of unique items and to enhanced online market technologies and enhanced markets for such unique items in addition to artworks. In some cases, the unique items are any type of items that are one-of-a-kind, not fungible with other items, and sometimes have significant value. A few examples are real estate, and luxury categories such as wine, jewelry, watches, couture fashion, cars, yachts, and expensive sneakers, to name just a few.

Among the innovative features of this enhanced online market technology and these enhanced online markets are the following.

Comprehensive Catalog and Analytics

As a feature in its own right and as a basis and foundation for other features, the enhanced online market technology accumulates, develops, stores, updates, uses, presents, and maintains a comprehensive and persistent catalog of unique items for a given enhanced online market (for example, unique artworks in an enhanced online art market). The catalog includes unique items that (a) are being consigned and offered for sale by seller participants on the enhanced online market, or (b) even if not being consigned and offered for sale, have attributes relevant to a scope of the enhanced online market. For example if the scope of the enhanced online market is artworks, the catalog would include artworks not being offered for sale. The number of unique items for sale as a percentage of all of the unique items in the catalog may be very small. In theory, the intended comprehensiveness of the catalog could be universal, that is, meant to include every possible unique item in the world that meets criteria (a) or (b) within the scope of the enhanced online market. Over time, the catalog grows as more information is received about artworks not previously in the catalog. The catalog is persistent in that once a unique item has been included in the catalog, it may remain in the catalog indefinitely, without regard to whether it is being offered for sale, sold, or even destroyed.

The catalog can be maintained in the form of records of a database stored on one or more servers, for example. In some implementations, the catalog can be held on a block chain or other immutable ledger. Each record of the catalog contains detailed specific values for a wide range of attributes and groups of attributes of the corresponding unique items. The enhanced online market technology also stores values of attributes not specifically associated with any individual unique item. A schema of possible attributes and groups of attributes in the case of an artwork market is shown below. For example, for an enhanced online market that has a scope spanning artworks generally (that is, a general art market), the catalog could include a record for Picasso's Guernica in which attributes of the record could identify the artist, the name of the work, the genre, the style, the period, the size, the condition, the current owner, and a wide variety of other attributes.

Information is available online about millions of unique artworks as a result of, among other sources, auctions and sales of those artworks, publications, catalogs, museum collections, galleries, shows, and other events, over time. Some of the information is available freely, some is available by subscription or negotiation. The information can include historical prices at which the artworks were sold, the dates of sales, the artist, the genre, and a wide variety of other attributes of the artworks. This source market data can be captured in various ways including scraping webpages, purchase, or permitted use of databases.

A feature of the enhanced online market technology is that it continually and automatically accumulates and stores such available market data, both historical and current, and other information representing other attributes of artworks and other factors relevant to the past, current, and future prices of the artwork. The market technology also applies analytical processes to analyze the market data and generate derived market information. The derived market information can include aggregations, statistical representations, trend information, summary information related to particular artists, genres, time periods, prices, and other factors and attributes. The derived market information can include determinations, estimations, and predictions of prices in real time by a process that can be based on a predictive model that uses machine learning and artificial intelligence.

Thus, the enhanced online market technology includes a market data process that accumulates, stores, and makes available to the public (or privately in certain cases) parts or all of the source market data and derived market information in a variety of formats.

The market data process of the enhanced online market technology serves information to user computing devices, including real-time data (among other things, real-time prices and historic pricing information), detailed analysis of price trends for one or more artists and market trends, indices, and information associated with financial context and cultural context.

In addition the market technology includes a transactional process that serves to devices of participants, user interface controls and information to enable participants to initiate, engage in, and complete market activities in the enhanced online market. Among other things, the market activities are associated with sale transactions that involve buying and selling of listed items, typically with the benefit of the source market data, the derived market information, and the financial context and the cultural context, all in a secure environment where the user can maintain discretion and control of the process, in particular control of the opacity of the transaction activities by the seller.

The combination of the server-implemented market data process and the transactional process of the market technology—whether implemented separately and independently or as an integrated combination—overcomes at least two significant hurdles confronted by participants who are collectors of unique items as they participate in the market. Those two hurdles are the difficulty of discovering the price of an available unique item and the inaccessibility of information useful in evaluating a unique item. As a result the market technology can provide transparency in markets such as the art market that are acknowledged as being opaque. In addition, the art market has historically been a closed network of a small group of insiders and is operated by a relatively small group of intermediaries that control and limit access to information, pricing, and viewing of artworks.

The market technology provides transparency to a market for artworks or other types of unique items. Because of the transparency the market technology assures a more fluid market in which supply and demand determine prices, and provides buyer participants and seller participants with information and a forum for making informed decisions about individual artworks or other unique items or an entire portfolio of unique items.

The market technology uses machine learning and artificial intelligence models and processes to estimate prices of artworks or other unique items accurately and to provide recommendations for buying and selling opportunities based on real-time updating of the source market data and derived market information. The participant (especially a seller participant) maintains control and discretion over the participant's market activities and the transparency of them to other participants. By "estimating a price" we mean estimating the price at which a well-informed willing buyer and a well-informed willing seller would engage (or would have engaged at an earlier time) in a purchase and sale transaction for a particular unique item.

The source market data is obtained from hundreds of public and proprietary global data sources. The catalog includes transaction data for tens of millions of market transactions over a period of 40 years. At least some of the source market data is received as live feeds. As new transaction data arrives, the enhanced online market technology applies the data to a machine learning predictive price model to generate updated market and sector indices, artist price momentum for each artist, price estimates and price histories for each related artwork (e.g., value profiles or value performances), a set of similar or comparable artworks for each related artwork, and real-time buy-sell signals for seller participants and buyer participants. The transaction data is also stored in the corresponding records of the catalog.

In some cases, artworks of emerging artists may have relatively little auction or negotiated sale results in the source market data. The predictive pricing model process of the enhanced online market technology nevertheless tracks the evolution of estimated values and measures the past and future influence of museums and galleries globally, as well as trends in an artist's media coverage and social media mentions and followers. This is sometimes referred to as cultural significance scoring. The predictive pricing model can recognize patterns in the value performance of the artworks during the career spans of hundreds of thousands of artists and patterns of systemic bias towards specific artist categories.

Attributes

In some implementations for the art market, the attributes maintained for records in the persistently stored catalog of artworks could include the following:

Artwork Infrinsic Features

Artist
    Medium
    Type (2D, 2D Edition, 3D, 3D Edition)
    Edition Size
    Edition Number
    Edition Types (2D: Regular, Artist Proof, -continued Printer Proof; 3D: Foundry, etc.)
    Creation Date
    Creation Century
    Creation Decade
    Years from creation to sale
    Title
    Materials
    Surface
    Substrate
    Height
    Width
    Depth
    Painting Area (H × W)
    Inscription (Signed, Titled, Dated)
    Inscription (expanded vocabulary)
    Provenance
    Literature
    Exhibitions
    Condition (short vocabulary)
    Condition (full vocabulary)
    Damage
    Framing
    Related Works Image Derived Features Image vectorized (EfficientNet B4)
    Style (impressionism, cubism, etc.)
    Genre (portrait, landscape, etc.)
    Subject Matter Keywords
    Color
    Clustering of images (for a given Artist and across Artists)
    Artwork Series Sale Features Auction House Name
    Auction House rank (Top-tier, 1st-tier, 2nd-tier . . .
    Sale Date
    Sale Year
    Sale Month
    Sale Name
    Sale Type (day/evening/online)
    Sale Department
    Sale Price
    Sale Location
    Auction Estimate (high-low)
    Number of bidders
    Number of bids
    Bid increments (and other bid statistics)
    Is lot guaranteed?
    Is lot bought-in?
    Is lot withdrawn?
    Premium lot?
    Reserve met?

Statistical Features

Group: artist name. Stat functions: min, max, mean. Periods (years): 1, 3, 5, 10
    Group: medium. Stat functions: min, max, mean. Periods (years): 1, 3, 5, 10
    Group: artist name, medium. Stat functions: min, max, mean. Periods (years): 1, 3, 5, 10
    Group: artist name. Count all, successful and failed sales. Periods (years): 1, 3, 5, 10
    Group: artist name. Calculate quasi-median. Periods (years): 1, 3, 5, 10
    Group: medium. Calculate quasi-median. Periods (years): 1, 3, 5, 10
    Group: artist name, medium. Calculate quasi-median. Periods (years): 1, 3, 5, 10
    Artwork normalization Artist Features Artist Indices
    Artist Cultural Significance attributes
    Similar Artists (e.g., by Movements)

| | |
|---|---|
| External Features | |
| | Financial indices (equities, gold, real estate) |
| | Economic Uncertainty index (location-specific) |
| Data Processing Hints | |
| | Lots' price adjustment for inflation |
| | Replace original price with log of price |
| | Train on artworks from target price range (trapped there at least once) |
| | Train dataset is built with the first successful sale of any distinct artwork only |
| | Train dataset is built with all successful sales of any artworks |
| | Drop outliers from train and test |
| | Hammer Price vs Price With Buyer's Premium |
| | Special-case Guaranteed, Bought-In, Withdrawn, Unsold, and Passed lots |
| | Apply different models depending on the Artist, Type (2D, 2D Edition, 3D, 3D Edition), and Period (Postwar, Contemporary Impressionist and Modern, Old Masters, Asian, etc.) |

When the unique items are not artworks but are other types of items, the list of attributes will be appropriate to that class.

Prices

The attributes maintained in the records of the catalog can include information about prices of artworks or other types of unique items. We sometimes use the terms "price" and "value" interchangeably. One or more different price attributes can be included in a record for a given unique item. The prices can include, for example, one or more estimated values, one or more actual historical prices, and one or more offered prices (for example a price offered by a seller that is neither a current value nor an historical price). Actual historical prices can be prices of negotiated sales or auction sale prices, for example. The record of a given unique item in the catalog can include a history of all of the sale prices and corresponding dates for all sale transactions and a profile of estimated values of the unique item over a period of many years up to the present time.

A unique artwork has a value that can vary over time and be difficult to ascertain because the value is dependent on a wide variety of dynamic factors. Sometimes information about the factors that affect a current price are unknown to anyone but the owner, for example, the exact condition of a painting or the history of prices of the artwork in prior transactions. Sometimes the information is deliberately hidden as part of the control asserted by intermediaries in an art market or as part of an owner's effort to maintain privacy. Some of the factors that affect price are specific attributes of the particular item of artwork, such as the artist, the genre, the age, the size, and many others. Other factors affecting the current value of a unique artwork are external to the particular artwork and apply to multiple unique artworks. These external factors can include general economic conditions, general trends in the values of artworks, shifts in the general interests of buyers based on genre, or time period, and changes in the average wealth of potential buyer participants, for example. The value of a unique artwork at a given time can represent a price at which a willing seller and a willing buyer would then engage in a transaction to transfer the artwork from the seller to the buyer.

Although it is hard to determine with certainty an accurate value of a unique item at a given time, the enhanced online market technology can determine estimated values and estimated ranges of values of a unique item of the catalog at any arbitrary time. From these estimated values and actual historical prices over time the enhanced online market technology can determine a value profile or value performance of the changing value of a given unique item over time. We sometimes use the term value performance to refer to the profile of changing value and to other computationally derived values associated with performance of the value of the unique item. The derived values can include price momentum (value momentum), value performance comparisons for an individual unique item and another unique item or group of items, or other parameters.

A value of a unique item can be an estimate generated by the enhanced online market technology using machine learning techniques as described later. An actual historical price can be a known price at which the unique item had been previously sold through negotiation or at auction, for example.

Estimated values of unique items are useful, for example, to buyers, sellers, owners, investors, advisors, dealers, appraisers, and other participants who engage in transactions in the market or observe or analyze the market and the unique items traded in it.

The price attributes stored in the catalog for various unique items can be used for a wide variety of purposes by different types of participants including the following examples. Buyer participants can use current prices and historical prices of a set of unique items of interest to gauge, within a range, how much it would cost to acquire a unique item having similar attributes. Sellers can use current prices and historical prices of such a set of items to gauge an appropriate offer price for a unique item having similar attributes. Owners of portfolios of unique items can use current prices of the unique items to determine the current value of a portfolio. Investors can use sequences of historical prices to gauge the merits of investing in a particular unique item. Advisors can use current prices and historical prices to understand the general state of an online market in the unique items and to counsel clients about the online market.

In some implementations, source market data for an art market can be obtained from auction tracking web applications and other apps such as the app previously known as Live Auction Art and now licensed to the assignee of this patent application. The features of web and app platforms such as Live Auction Art can be enhanced using the enhanced online market technology so that a search for a given artwork yields current prices and historic pricing information, detailed analysis of artist and market trends, comparable works available on the market, and financial and cultural context information.

In addition to providing access to historical and real-time data relating to artworks available on the public market, such web apps and other apps can use the enhanced online market technology to provide to participants estimated prices for artworks in their own collections.

In such implementations, a participant can upload attributes of each of the artworks, including images and be presented with the estimated price and a recommendation for actions to be taken including to hold the artwork, to pursue a discreet private sale, or to consider buying other similar artworks.

Price Estimation Model and AI Features

Figure 39:
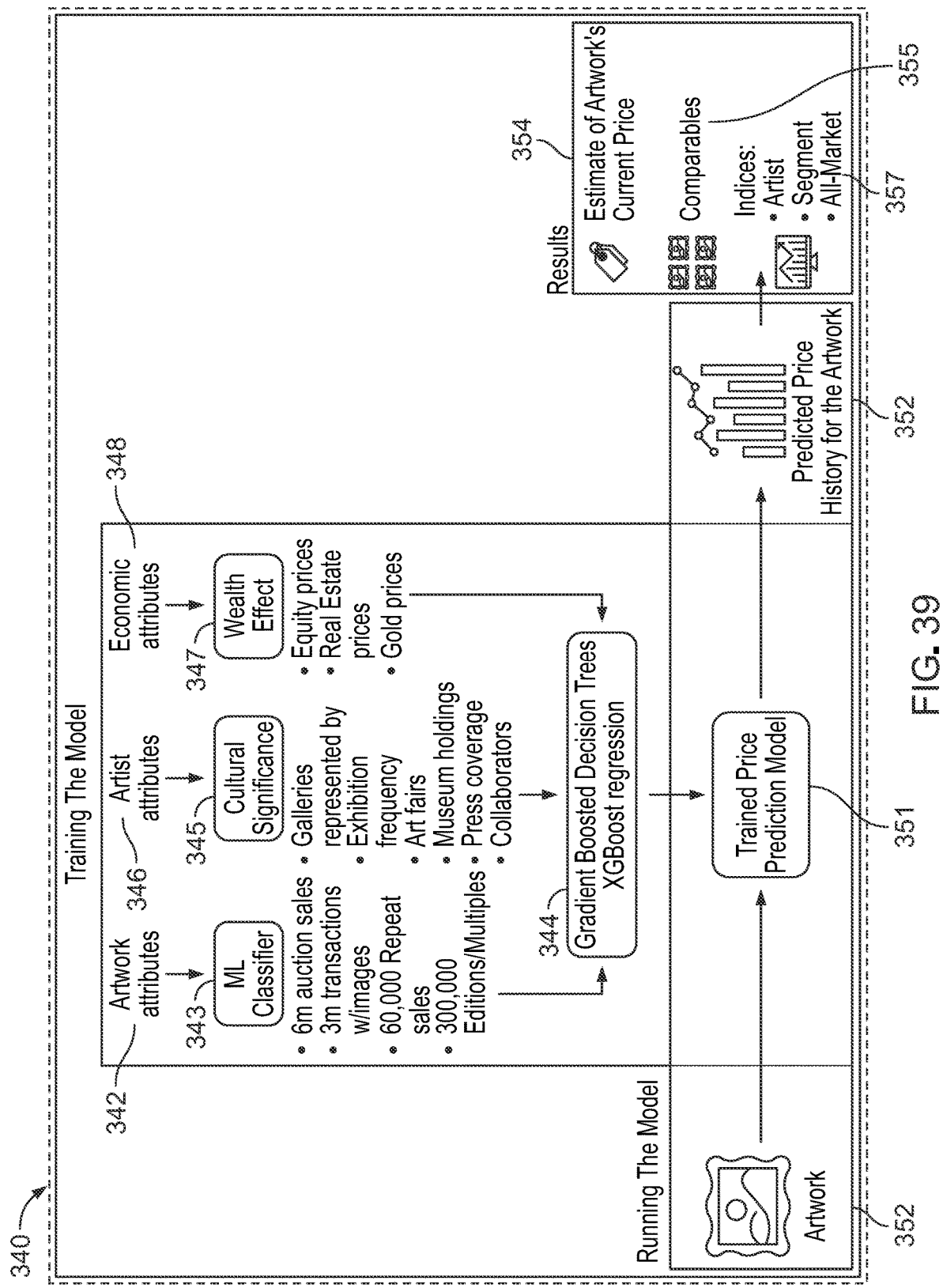

As shown in FIG. 39, the model for predicting and estimating values (prices) and history of values of unique items such as unique artworks is a trained predictive model 351 based on machine learning techniques. Prior to initial use (and subsequently from time to time), the predictive model is trained 340. The predictive model is based on values of a wide range of attributes (see the table of attributes above). The attributes can include, for example, attributes of individual artworks 342, attributes of artists 346, and general economic attributes 348. The attributes of the individual artworks include historical prices obtained from a large number of artwork auction sites, transactions with images of the artworks, repeat sales of given artworks, and values about editions and multiples of a given artwork. The attributes of the artwork are applied to a machine learning classifier 343. The attributes of the artists are attributes that are indicative of the cultural significance 345 of the artist's artworks, including the number and identities of galleries that represent the artist, the frequency of exhibition of the artist's artworks, the number and identities of art fairs in which the artist's works were shown, museums holding the artist's artworks, press coverage of the artist and the artist's artworks, and the identities of collaborators with the artist. The economic attributes are indicative of a general wealth effect 347 (general change in wealth) in the economy, including equity prices, real estate prices, and gold prices. Prices of artworks can vary with the general wealth of the potential participant buyers. The three sets of information are used to form or update gradient boosted decision trees 344 that form the trained price prediction model 351.

Once the trained model is in place, it is run on every artwork in the catalog to produce a price history 352 for each of the artworks. The price history is part of the value performances of the artworks. The price history represents a time sequence of estimated prices of the artwork up to the current time. The predictive model can be run initially to populate the relevant attributes of the catalog with price histories. The predictive model is also run on any artwork that is newly added to the catalog and on any artwork for which new or changed data has been received. As a result the catalog's price histories are always kept current in real time. Once the price histories are available in the catalog, an analytical process of the enhanced online market technology can use them to derive other results 354 that are useful in the operation of the enhanced online markets for unique items and for presentation to participants. For example, comparisons 355 can be made between the value performance of an artwork and one or more other artworks, and indices 357 can be generated for the artist, a segment of the art market (by genre, period, style, school, or other aspects), and for the entire art market.

Controlling Opacity or Transparency of Market Listings

An owner of a unique item that is an artwork, for example, can sell it in a conventional market. The owner typically offers the unique artwork through an intermediary who operates as part of an opaque art market. Information about the artwork and the owner, for example, may be carefully controlled and provided only piecemeal to potential buyers in a way that is believed to benefit the seller and yield the highest price at the time of sale.

Using the enhanced online market technology, the opacity or transparency of listings of unique items can be controlled by the seller participants or automatically controlled by one or more servers of the enhanced online market technology or by a combination of them. The level of opacity or level of transparency of the listings can be staged based on timing or a state of a sale transaction associated with the listing, to help a seller participant in the enhanced online market to reap at least the current estimated price in the sale transaction for a unique item being listed. By level of opacity or level of transparency we mean the extent to which an offer price and other information (e.g., private information) about a unique item are accessible to one or more other participants in the enhanced online market.

In some implementations, the seller or the enhanced online market technology or a combination of them can control the level of opacity or the level of transparency with respect to individual other participants or groups or classes of other participants in the enhanced online market. For example, the offer price or other information can be exposed to another participant in the enhanced online market if the profile or market activities (or both) of the other participant indicate that the other participant is a qualified or interested potential buyer of a unique item or if the seller decides to expose such information to a particular participant or group of participants.

Among other benefits, by enabling control of the level of opacity or level of transparency of the exposure of certain information on the enhanced online market, seller participants will be able to protect private information and expose the private information only if and when they wish, for example, at an appropriate moment during the stages of a sale transaction. The control of the level of opacity or level of transparency can be fine grained by applying it only to certain pieces of private information at a given time and by staging the exposure of various pieces of the private information over time or both.

The level of opacity or level of transparency controllable for each of the listed unique items can include one or more of: a textual description (one or more of a title, year of production, medium, or size) of the unique item, the artist, an image, the provenance, and the estimated price. With respect to seller attributes, the level of transparency or the level of opacity can be controlled as to the name or address or other personal identifying information of the seller participant.

When a unique item is listed by a seller participant, instead of presenting information about the unique item itself, the enhanced online market technology can present proxies for the unique item. The proxies can include other unique items that are similar enough to the listed unique item to represent it for purposes of interesting potential buyer participants in buying it, at least in the initial stages of marketing and negotiation. The similar or comparable unique items to be presented as proxies can be determined by a proxy process of the enhanced online market technology. The proxy process can determine the proxies by analysis of the attributes of unique works in the catalog that are in the vicinity of the listed unique work in the multi-dimensional space represented by the catalog. The enhanced online market technology also can algorithmically suggest a default level of opacity or transparency based on the unique item's attributes and the seller participant's preferences. The automatically recommended level can be adjusted by the seller participant.

When an estimated price is being generated with respect to a unique item being listed by a seller participant, the decision trees of the pricing model can base the estimate on a breakdown of its components. Some of the components are intrinsic to the unique item, such as size, colors, composition, artist, and others. Some of the components relate to attributes external to the unique item, such as price attributes of similar artists, performance of the stock market, demand trends and others. The more detailed is the information (attributes) about the listed unique work provided by the seller participant, the more accurate the estimated price can be. The estimation of the price and its presentation to the listing seller participant and the receipt of additional attributes from the seller participant can be interactive and iterative as an incentive for the seller participant to provide more attributes.

Converting Browsing Participants to Buying Participants and Selling by Proxy

Participants in the enhanced online market may act in a role of browsers in which they have a relatively low level of interest in buying unique items. One feature of the enhanced online market technology is in altering the interest level of certain participants who are acting as browsers and converting them into participants who have a higher interest level as prospective buyers.

In some implementations of the market technology, sellers of unique artworks can submit listings that position the art works to be displayed for sale on the enhanced online market. For reasons of privacy and to optimize the likelihood of finding a willing buyer, the market technology can withhold from public view the fact that the artwork is for sale or details about the listing of the artwork. Instead the market technology can manage the enhanced online market so that unique artworks being offered for sale may not be shown to a participant who is merely browsing artworks through the user interface until the participant has been enticed to become and is then qualified as a serious buyer by the market technology. In effect one of the features of the market platform is to convert browsers to buyers, with the goal of optimizing aspects of listing artworks, especially optimizing the number and seriousness of potential buyers and the prices they eventually pay in sale transactions.

In some implementations of the market platform, participants are converted from browsers to buyers by enabling (or requiring) them to "shop by proxy". The market platform is able to provide a shop-by-proxy mode of shopping for participants because the market both (a) holds unique artworks on consignment for sale on behalf of sellers and controls certain aspects of the presentation of the listings for those artworks, and (b) controls a vast amount of source market data and derived market information. As a result, when a participant is browsing through artwork records of the catalog, the market platform can present to the participant through the user interface, records of market data and derived market information for a set of corresponding artworks. The artworks included in the set can be determined by the market technology based on criteria entered by the browsing participant in a search facility presented through the user interface, and based on other information available to the market technology in much the same way that a search engine bases the "hits" presented to a user on a combination of search criteria and other information known to the search engine.

In particular the information available to the market platform in the market technology includes source market data and derived market information about consigned artworks. Consigned artworks can be artworks consigned, for example, by a collector, an artist, a dealer, or even a museum wanting to deaccession some of its inventory, any of whom could be a market participant. Because one objective is to convert browsing participants to buying participants, the market platform can, for example, present to a browsing participant records for catalog artworks that are similar to one or more of the consigned artworks with respect to one or more attributes or factors. For example, if a browsing participant searches for late-$19^{th}$ century impressionism artwork and if one of the consigned artworks is a seascape by Paul Cezanne, the browsing gallery of catalog artworks could include post-impressionist paintings of Paul Cezanne (other than the consigned artwork) and Gauguin, Seurat, and van Gogh. The browsing participant can then navigate the browsing gallery. If the browsing participant then invokes one of the Paul Cezanne catalog artworks in the browsing gallery, the gallery presentation process could update the set of artworks in the browsing gallery to include only works of Paul Cezanne (but not the consigned artwork) of various subjects.

In effect, a gallery presentation process of the enhanced online market technology uses the dynamically changing presentation of comparable non-consignment catalog artworks to drive the interests of a browsing participant in a more and more fine-tuned way toward a possible interest aligned with the attributes of the consigned unique item. In some simpler implementations, the enhanced online market technology can directly present the actual consigned artwork (in this case, the Cezanne seascape) in the browsing gallery, perhaps intermixed among the comparable non-consigned artworks. In this case, this Cezanne seascape could be labeled as "available for sale" so that the browsing participant has an opportunity to immediately initiate the buying process. This case would arise if the selling participant was not concerned about "burning" his Cezanne seascape and chose to list it on the marketplace with a high level of visibility (a low level of privacy).

The gallery presentation process uses artificial intelligence techniques to dynamically update the presented browsing gallery based on the sequence of navigation by the browsing participant and information about the catalog artworks. The set of comparable non-consignment catalog artworks selected for inclusion in each update of the browsing gallery is fuzzy relative to the consigned artwork in that sense that, rather than jumping directly to presenting the consigned artwork to the browsing participant, the process presents only catalog artworks that have a fuzzy relationship to what will ultimately be presented.

The choice of which artworks to present in a browsing gallery is based in part on whether the browsing gallery will be presented to a potential seller or to a potential buyer. A profile is created and maintained by the market technology for each of the participants to aid in the gallery selection. The profiles are generated based on, among other things, information provided by the user and activities of the user on the enhanced online market. The information and activities can include a browsing history in an auction price database, "likes" attributed to particular artists or to artworks, explicit wish lists, and others.

In a sense, the catalog artworks can be viewed as occupying a multi-dimensional space in which each of the dimensions corresponds to a different attribute of the artworks. The consigned artworks are also positioned in the multi-dimensional space. When a browsing participant begins by entering a search, the search corresponds to a region in the multi-dimensional space. As the process proceeds back and forth between the browsing participant navigating the browsing gallery and the gallery presentation process updates the set of catalog artworks being presented, the process moves through the multi-dimensional space to regions that are closer and closer to the consigned artwork and more tightly defined.

Similarity Process

In the process of converting browsers to buyers and in implementing other features of the enhanced online markets, it is useful for the enhanced online market technology to be able to identify unique items that are similar under particular criteria (similarity parameters). For this purpose the enhanced online market technology can implement and use unique item similarity filters.

Each set of unique items that have been listed for sale can be described by a corresponding specific set of the similarity parameters. Then, for a given unique item identified as interesting by a participant during browsing (which, as a matter of statistics, would typically not be in the set of unique items listed for sale), the similarity process computes the value of the similarity parameters and generates a similarity set from the catalog such that the resulting similarity set has the same (or as close as possible) similarity parameter values as the set of unique items that are for sale. In other words, the enhanced online market technology selects the (default) values of the similarity filters for a given unique item being browsed to focus the participant on a similarity set of other unique items available for browsing that is most similar to the set of unique items that are available for sale. The following table identifies possible similarity parameters for use in the similarity filters."

| Filter Groupings | Similarity Parameters |
| --- | --- |
| Visual Characteristics | Composition |
|  | Color |
| Style & Genre | Style |
|  | Genre |
|  | Subject matter keywords |
| Size & Materials | Medium |
|  | Surface material |
|  | Substrate material |
|  | Size (height, width, depth) |
| Financial Performance | Market value estimate |
|  | Price momentum |

The scope of the unique items (e.g., artworks) to which the similarity filters are applied can be controlled based on the participant's objectives. For example, the participant can select among the following options: Artworks by a given artist (e.g., artworks by the artist that is currently the object of the participant's browsing). Artworks by similar artists (e.g., artists of the same period or movement or artists who have similar financial performance characteristics such as artist index). Artworks by all artists in the catalog.

Although it would be possible to enable a participant to adjust each similarity parameter separately to specify an optimal set of similar artworks, this degree of control may make a user experience too cumbersome. For this reason, in some implementations, the similarity parameters can be grouped into a smaller number of filter groupings (see table above). Each filter grouping can be controlled by a user interface element (e.g., a multi-state button or a slider), which changes the value of the filter grouping within a range. This value for the filter group is then passed on to each included similarity parameter for use in applying the filter, thus achieving a good balance of user experience and similarity matching precision.

Transactional Component (Peer-to-Peer Trading Platform)

The enhanced online market technology uses artificial intelligence to match buyer participants and seller participants based on hundreds of attributes include artwork attributes, personal preferences, and market conditions. The matching process improves over time using machine learning by studying which artworks a participant owns, sells, buys, or wants to own. a portfolio optimization process recommends transactions for seller participants and buyer participants based on the participant's capital, market conditions, and available artworks being offered for sale.

The transactional process of the market technology provides, through the enhanced online market and user interfaces, a peer-to-peer trading platform on which participants can buy and sell artworks. The platform is peer-to-peer in the sense that there need be no human intermediary interposed between the buyer and the seller. The ability to buy and sell art works on the platform is open to any participant. The participant, in particular the seller participant, has control over at least some aspects of the process of negotiating a transaction. The control can extend to the nature, depth, and amount of information included in the visible listing of an artwork, and the staging of successive steps leading from a listing to a sale.

Combined Market Data and Transactional Features

Some users of art markets are primarily interested in learning historical price and other information about artworks and the artwork market. For example, an owner of a portfolio of artworks may be interested in how such information about other artworks may affect her understanding of her own portfolio. Or a new participant in the art market may want to develop a sense for a range of artworks and their prices. As explained earlier, such information may be hard to get in a conventional art market.

Of particular interest to buyers and sellers is also the opportunity to participate in the art market by buying and selling artworks, but as noted above art markets are often hard to access.

The market technology that we describe here provides online access to the public both to pricing and other market data about artworks and the art market and to transactional features for engaging in a process of buying and selling unique artworks.

For this purpose, the market technology includes (among others) two technological components: a market data component and a transactional component. As explained in more detail later, each of the two technological components can be made available (served) online from one or more servers through the Internet to smart phones, tablets, notebooks, or other user computing devices of buyers and sellers. Each of the technological components serves user interfaces to the user computing devices as web pages that can be presented in web browsers running on the computing devices or as user interface controls and information that can be presented by apps running on the computing devices. The user interfaces of the data component and the transactional component can be served separately and independently through the Internet or as a loosely or tightly integrated entity in a unified user interface.

Browser Plugin

In addition to serving its own pages of a user interface through browsers and dedicated apps running on devices of participants (in effect providing a dedicated application of the enhanced online market for artworks), the enhanced online market technology can also provide a plugin or extension or other add-in to be executed in conjunction with the presentation of websites and apps other than the native user interface of the enhanced online market for artworks.

For example, in some implementations, at the request of a participant in the enhanced online market for artworks or other user, a browser extension can be installed for one or more Web browsers. When the browser is launched, the browser extension runs in the background and automatically and continually parses the text of any page being presented. When the browser identifies any text that names or references any of a large number (e.g., 120,000) of artists or the title or image of any of a large number (e.g., millions) of artworks represented in the catalog, the browser requests the server to provide value performance information (such as estimated price, price momentum, and price history) about the identified work or about works of the artist of the identified work or about works that are similar to the identified work (comparables). Additionally, if the user is on the website of an auction house, the artworks can also be identified by the lot number. If the user is on the website of a gallery, the artworks can also be identified by the catalog number. If the user is on the website of an art fair, the artworks can also be identified by the exhibition number.

The browser extension then overlays on the presented page information about the identified work or about one or more of the comparables and one or more invocable controls to enable the user of the browser to navigate to the user interface of the enhanced online market for artworks. The invocable controls can be labeled, for example, "sell similar" and "buy similar" and when invoked can, for example, cause the enhanced online market for artworks to be launched on pages that enable the user to view similar artworks and engage in sale transactions as a buyer participant or a seller participant. In some cases, the browser extension can provide additional information, such as value performance information, about the artwork to which reference is made on the page being viewed.

In effect, the browser extension behaves as a web surfing companion for a participant when browsing other websites.

The browser can appear on the third-party page in one or more states, including a collapsed state in which only basic information about the identified artwork is shown and an expanded state in which more information and controls are shown.

Figure 36:
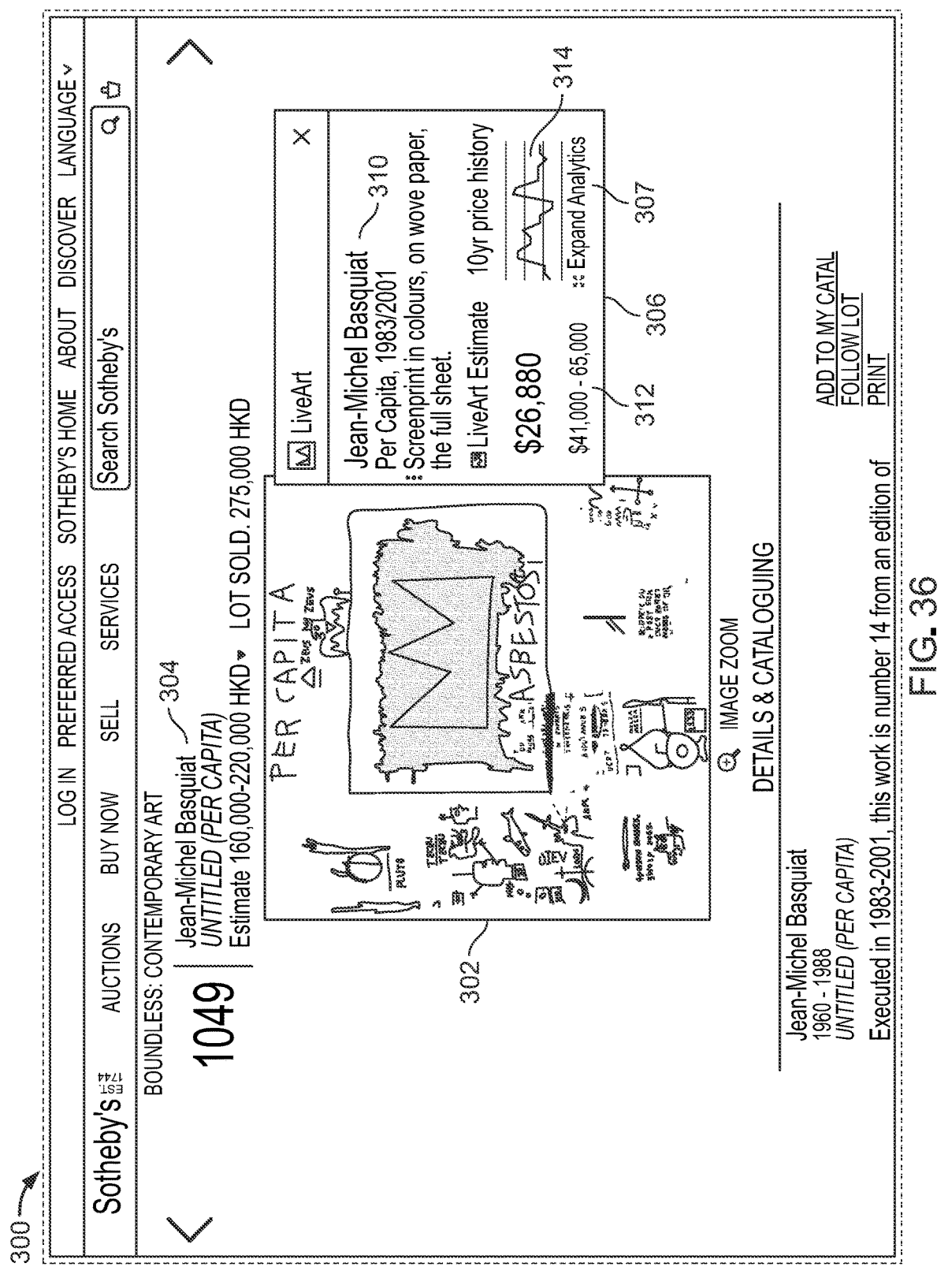
Figure 37:
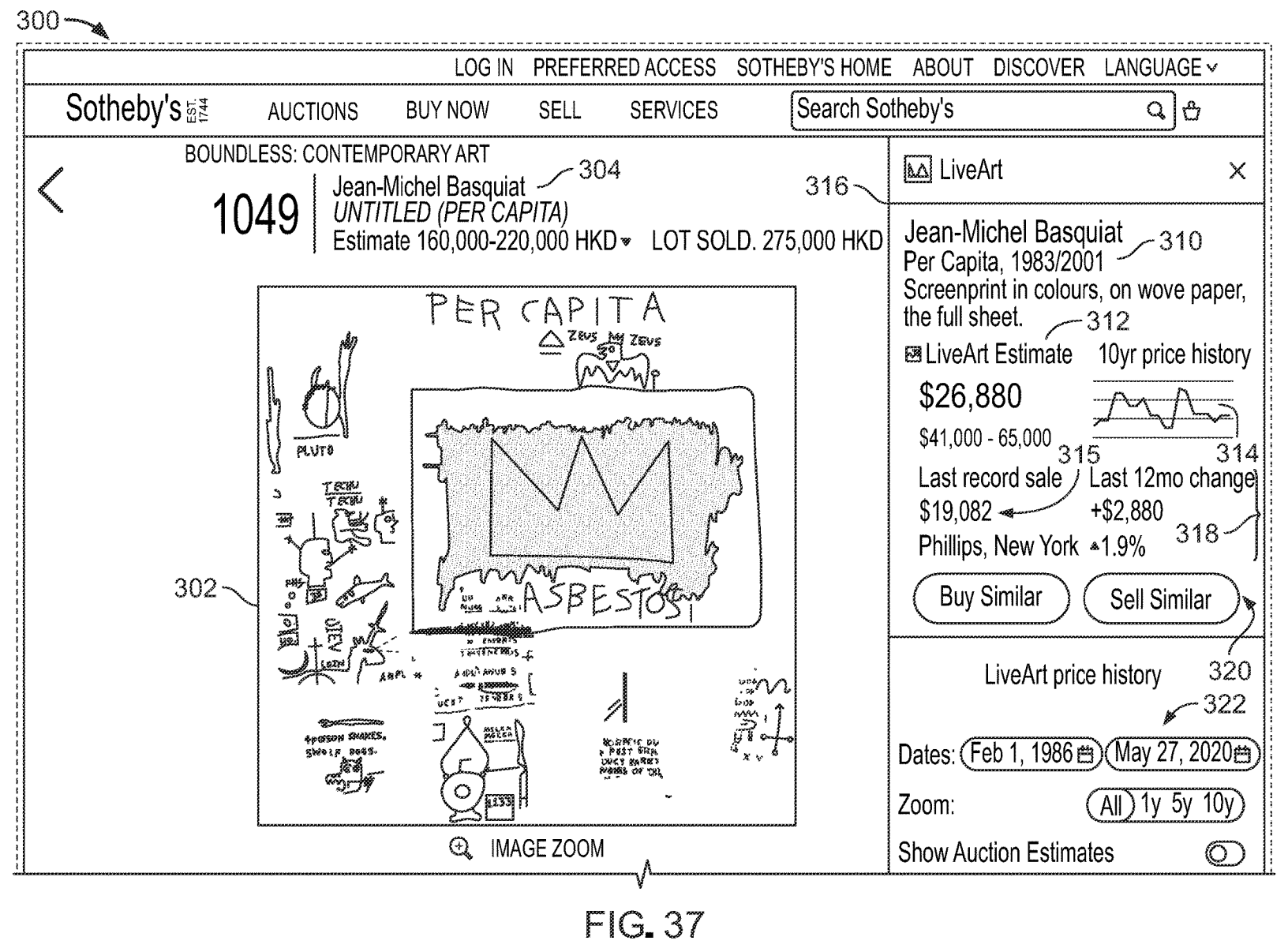

For example, as shown in FIGS. 36 and 37, a page of a Sotheby's website illustrates an artwork 302 and provides a title and a name of the artist 304. In a collapsed state, the browser extension is displayed in a window 306 overlaid on the webpage. Additional bibliographic information about the artwork, its 10-year price history and its current estimated price 312 are presented within the overlaid window. A control 307 can be invoked to obtain additional information in an expanded state of the window, shown in FIG. 37. A last recorded sale 315, price change for the last 12 months, controls to buy similar or sell similar 320, price history 322, and prior sale information 324 are then added to the information already shown in the collapsed state. The information shown in the expanded view can include a wide variety of elements of the kind presented in the native user interface of the enhanced online market for artworks.

Shopping or selling by proxy can also be used when a participant buyer is browsing unique works externally to the enhanced online markets for unique items, for example, if browsing an auction price database. Shopping or selling by proxy can be implemented for artworks displayed on third-party sites through, for example, a browser plug-in.

An additional feature included that can be provided in implementations of the enhanced online market technology on mobile devices that use iOS and Android operating systems is an augmented reality feature in which the participant can point the camera of her device at an artwork and promptly be shown the estimated price, comparables, artist information and other artificial intelligence generated information about the artwork.

When the unique items are of a category other than artworks, the browser plugin can be configured to recognize and provide information based on other kinds of attributes.

Online Portfolios

Through a portfolios feature of the user interface of the enhanced online market, a participant can create, manage, update, and otherwise work with online portfolios of the unique items in the catalog. The participant can include in a portfolio artworks owned by the participant, or can select any arbitrary art works to form a hypothetical portfolio. The portfolio could include art works meant to replicate an actual portfolio of another party. Other portfolio complements are also possible including historical portfolios or current portfolios. The user interface can then present to the user a composite current price of the portfolio or a composite historical price using the pricing estimation process or other value performance parameters.

Security, Deal Flow, and Automated Fulfillment

Figure 38:
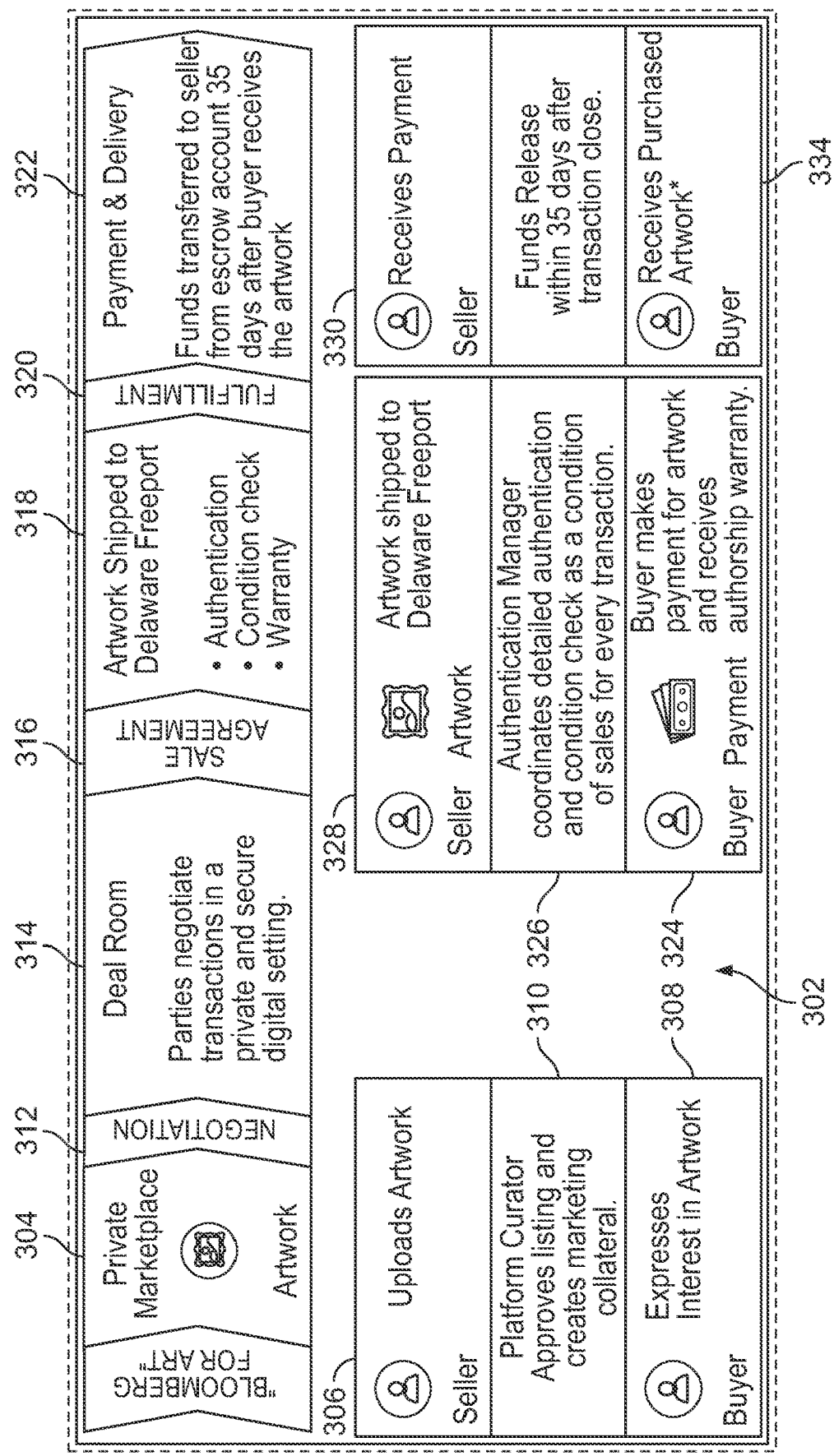
FIGS. 38 and 39 are block diagrams.

As shown in FIG. 38, the enhanced online market technology operates the enhanced online markets using techniques configured to assure the privacy and security of the participants and information about their artworks. The part of the enhanced online market 302 associated with offering an artwork for sale and consummating a sale transaction begins with what can be considered a private marketplace 304. The seller participant uploads and lists her artworks 306. A curator approves the listing and creates marketing collateral 310. Then a buyer participant may express interest in an artwork 308. Negotiation of a sale transaction 312 can be done in what can be called a deal room, where the buyer participant and the seller participant can negotiate a price in a private and secure digital setting 314. Once they reach agreement on a price for the sale transaction 316, the artwork can be shipped from the seller participant 328 to an intermediate destination 318 where the authenticity, condition, and warranty of the artwork can be reviewed. At the same time, the buyer participant 324 can make payment and receive the warranty. An authentication manager 326 coordinates the detailed authentication and condition check as a condition of sale for every sale transaction. Once the authentication has been completed, the fulfillment is finished by payment and delivery 322 in which the seller receives payment 330 and the buyer receives the artwork 334.

Potential buyer participants have several paths to discover unique artworks available for sale, including a search for a specific artwork or artist, or the opportunity to browse the market for individual works or similar examples (using the proxy approach described earlier). In some implementations, potential buyers are vetted by humans, and bank-level security is applied to protect all participant information that is collected by the enhanced online market technology.

Example Use Cases by Type of Participant

A variety of different types of participants can use the market platform based on the intensity, style, timing, purpose, and interest underlying their uses. Some examples are described below.

Prospective Buyer Participant

In one kind of use case, the seller participant's primary motivation is privacy. As described above, the enhanced online market technology enables the seller participant to sell by proxy. Then as participants browse the catalog of unique items, the unique items they search for and see are the comparables ("proxies") of the actual unique items listed for sale (possibly along with limited information about the actual unique items, adjusted by the seller participant). Once the buyer participant identifies unique items of interest that are listed for sale, and the prospective buyer participant is approved by the seller participant, they enter a deal room where the transaction is negotiated, consummated, and fulfilled.

In another kind of use case, the primary motivation of the seller participant is to generate demand for a unique item by increasing the number of interested buyer participants.

Portfolio Owner

The market platform can be used by participants (collectors or portfolio owners) who own portfolios of artworks based on one or more of the following motivations or interests. A collector may want a quick and easy way to manage her portfolio including learning individual and aggregate estimated prices (and other value performance parameters) of the artworks in the portfolio and adding artworks. The collector may seek relevant suggestions of artworks that are available for sale and are appropriate to the portfolio, for example, because they match the tastes or interests of the collector or attributes of the portfolio, such as prices. The collector may want to preserve personal privacy and privacy of information about the artworks in the portfolio. The collector may want to sell one or more of the artworks in the portfolio quickly or take another action. Confirming that she owns an artwork of great value or a unique artwork or belongs to a small group of elite art collectors or has taste similar to a person of historical interest or to a thought leader or influencer may be important to a collector. Another motivation is a wish to have unique artworks that are for sale be presented to only a very few other participants or to not have them proactively presented to any other people.

In some cases a participant can pretend to be the owner of a hypothetical portfolio by accumulating in the portfolio through the user interface, catalog artworks presented on the market platform.

A portfolio owner of real artworks can assemble an online portfolio on the enhanced online markets for unique items as a way to learn the price of each artwork and the value of the portfolio as a whole (and other performance value parameters). The online portfolio is assembled by the portfolio owner locating the artworks of her portfolio on the enhanced online market, for example, by searching and then manually adding them to the portfolio. The portfolio owner can also see how the estimated price of each artwork and the aggregate portfolio value have changed over time, and register to receive notifications of future price changes (and other value performance changes).

A portfolio owner may like the exclusiveness of being able to keep the content of her portfolio private and being able to invite an individual to view it for a short time.

In some cases, a portfolio owner may have a collection that she accumulated or inherited and may be uncertain of the taste or attributes that the portfolio represents. The analytical process of the market technology can analyze her portfolio based on the attributes of the respective artworks in the portfolio to determine and report the tastes and attributes. Once the taste has been analyzed, the analytical process can enable the portfolio owner to ask to be presented artworks that are appropriate to the portfolio owner's taste and price appetite.

An online adviser process of the enhanced online markets for unique items can identify the basis on which the portfolio is unique in terms of attributes of its artworks, such as styles and periods. Then the market platform can provide access to auctions that attract other participants who have similar tastes. In other words, participants in the enhanced online market can be profiled in terms of their taste and this information can be useful for a variety of purposes. Portfolio owners who have similar tastes or interests can be introduced to one another and can discuss or engage in transactions for artworks.

Investors

For purposes of discussion, portfolio owners who collect artworks to enjoy looking at them could be called aesthetic owners. By contrast some portfolio owners are investors who are drawn to the possibility of owning assets that have desirable financial characteristics (value performance), such as having stable values or holding the prospect of appreciation, that may serve investment goals of the investors.

The portfolio optimization process of the enhanced online market technology can generate and analyze profiles of investors and then select and recommend portfolios of artworks to be bought or sold by the investors for the portfolios to achieve investment goals. Because the market platform is aware of the consigned artworks, it is able to construct recommend portfolios that include the consigned artworks. Among other things this would be one way to identify qualified buyer participants and drive them to possible transactions for listed artworks.

A prospective investor can review recommended portfolios and can buy an entire portfolio at once or over time based on a monthly investment amount.

The portfolio process also could provide information to investors enabling them to understand which events in history have already influenced the aggregate price of the portfolio and consider future events and their possible effects, and how the dynamics of price changes in the portfolio compare with other possible investments including precious metals, corporate securities, and others. The investor can also compare the financial performance (value performance) of individual artworks or artists or styles or periods or combinations of them.

The online adviser process can help an investor manage his portfolio of artworks by warning about price changes, advising when to buy, sell, or replace artworks, and providing tips on how to add value to artworks, for example, by sending them to an exhibition or publishing them in a magazine.

One-Time Seller

In some cases, a participant in the market platform may want to engage in a one-time sale of one or more artworks. The user interface provides a sell section in which the participant can quickly create listings for the artworks by the following steps. The participant can select each of the artworks from the catalog of artworks if the artworks have records in the catalog or can list artworks that do not have records by completing the listing fields. Then the market platform shows the participant the estimated price of each of the artworks and shows attributes that affect the price. After entering an offering price for each of the artworks and confirming ownership of the artwork, the participant will automatically begin to receive purchase offers when made by buyer participants. If there are multiple offers, the seller participant chooses the best offer. Having made the sale, the artwork is shipped by professional handlers to the buyer, and after the authenticity of the artwork is confirmed by a third party, the purchase price is paid to seller.

One-Time Buyer

A participant who wants to buy a particular artwork, can search the artwork catalog to find it on the market platform. If the artwork is not currently for sale, the participant can turn on notifications to be alerted before other participants when the artwork becomes for sale. Once a sale transaction is arranged between the buyer participant and the seller participant on the enhanced online market, the buyer participant transfers the purchase price to a third party who checks the authenticity and condition of the art work and then forwards the purchase price to the buyer participant. Then the artwork is delivered to the buyer.

By this sequence of steps the buyer is assured by the market technology that the artwork is authentic and in good condition, that payment is secure, that shipping is professional handled, and that the buyer can understand the offered price and has the opportunity to negotiate the selling price.

Artist

An artist can be a participant in the market platform. The artist can input entries into the catalog for artworks that the artist has created and are not yet known to anyone else. As part of the input process the artist enters information about a variety of attributes of each of the artworks. The price estimator process then can use the attribute information and the pricing model to inform the artist of the estimated price and the basis on which that estimated price is determined. In the course of listing her artworks and seeing the estimated prices and basis for the prices, the artist can interpret her value as an artist and the value of her artworks and understand ways to increase those values. The authenticity of each of an artist's artworks must be confirmed in connection with listing the artwork for sale. However, an artist can complete a verification process through the market platform to reduce the time needed for future confirmation of the authenticity of her artworks.

User Interface

FIGS. 1A through 37, and 40 show example screen shots of pages and dialogs that can be served to user devices as part of the user interface of an enhanced online market for unique items, in this case an enhanced online market for artworks. The pages or dialogs can be presented to a participant on a user device through a browser running on the user device or through an app running on the user device, for example. In some cases, a page shown in the figures is split between two figures and labeled A and B to indicate the relationship, with the B figure representing a portion of the page that will appear below the portion of the page represented by the A figure.

FIGS. 1A and 1B show a home page which is the initial page typically presented to a participant when the website or application is launched. As shown in FIGS. 1A and 1B, most of the pages of the user interface have a common navigation bar 10. The navigation bar enables the participant to select menu items to invoke features of the enhanced online market for artworks. The buy art menu item 10 enables the participant to search for artworks to buy and to engage in transactions with sellers of the artworks. The sell art menu item 12 enables the participant to list artworks for sale and to manage stages of the presentation of the listings and steps in the completion of transactions with buyers of the artworks. The my collection item 14 enables the participant to create, update, view, share, and manage virtual collections (portfolios) of artworks. The market performance item 16 enables the participant to view a variety of information about the history, state, performance (e.g., parameters of the value performance), and other aspects of an artwork, a portfolio of artworks, the artwork market in general, and segments of the artwork market, for example. A search box 18 enables the participant to pose criteria for a search of the catalog of artworks maintained by the enhanced online market technology. A my LiveArt item 20 enables a participant to view and manage aspects of the participant's registration on the enhanced online market for artworks.

The home page also presents several sections that provide previews into features of the enhanced online market for artworks and an opportunity for the participant to invoke controls to explore the features in greater depth. The features include an artists section 22, an art index section 24, an upcoming auctions section 52, and a recommended artworks section 60 based on the catalog of artworks maintained by the enhanced online market for artworks.

The artists section 22 includes entries 30 for individual artists. Each entry presents fields of information about the artist including a thumbnail graph of the 10-year performance of the artist index, a percentage 34 indicating a 12-month momentum of the artist index, thumbnails 36 of artworks of the artist that were the subject of recent sale transactions, and a button 38 for the participant to follow the artist for purposes of operation and presentations of information by the enhanced online market for artworks. The artists shown in the artists section 22 represent only a tiny portion of the full space of artists covered by the enhanced online market for artworks. The participant can navigate the space of artists using navigational controls 24, 26, and 28 to view favorite artists, top artists (as determined based on the performance of the index for the artist), and top living artists, a subset of the top artists. For the artists in each of the categories specified by the controls 24, 26, 28, the participant can see more entries by invoking the load more control 35. The indexes and index performances that we refer to here and below are part of the value performance parameters discussed earlier.

The index section 40 presents information about the performance over time of value indices for artworks in the catalog of artworks. One part 44 shows graphs of indices normalized by the performance of an index for the complete catalog of artworks (which is represented as the 0 line of the graphs). Each of the graphs represents the performance of the value index for a corresponding genre of artwork as identified in the key 50, for example, the impressionist movement. The bar chart 45 presents volumes of sales of the various genres year by year. Navigational controls 42 and 46 and slider 49 enable the participant to select the time period to be covered by the graphs and charts of the index section.

The upcoming auctions section 52 presents entries 54 each reporting information 58 about an upcoming auction of artworks and providing a control 56 for the participant to invoke to join the auction live.

The recommended artworks section 60 provides a gallery of entries 62 each of a corresponding artwork. The enhanced online market technology automatically chooses which artworks to include in the gallery based on machine learning techniques, information available about attributes of the artworks, information about the participant, and objectives such as driving the participant's interest toward consigned artworks. The presented entries span only a small region of the multi-dimensional space of all artworks in the catalog of artworks. The participant can navigate the entries and the multi-dimensional space by invoking the thumbnail image or invoking the buy similar control 63. If the participant invokes the thumbnail image he is taken to a page featuring information about that artwork. If the participant invokes the control 63 it is an indication that the participant may be a qualified and interested buyer and the enhanced online market technology begins to include in the displayed gallery 60 artworks that are consigned for sale.

Figure 2A:
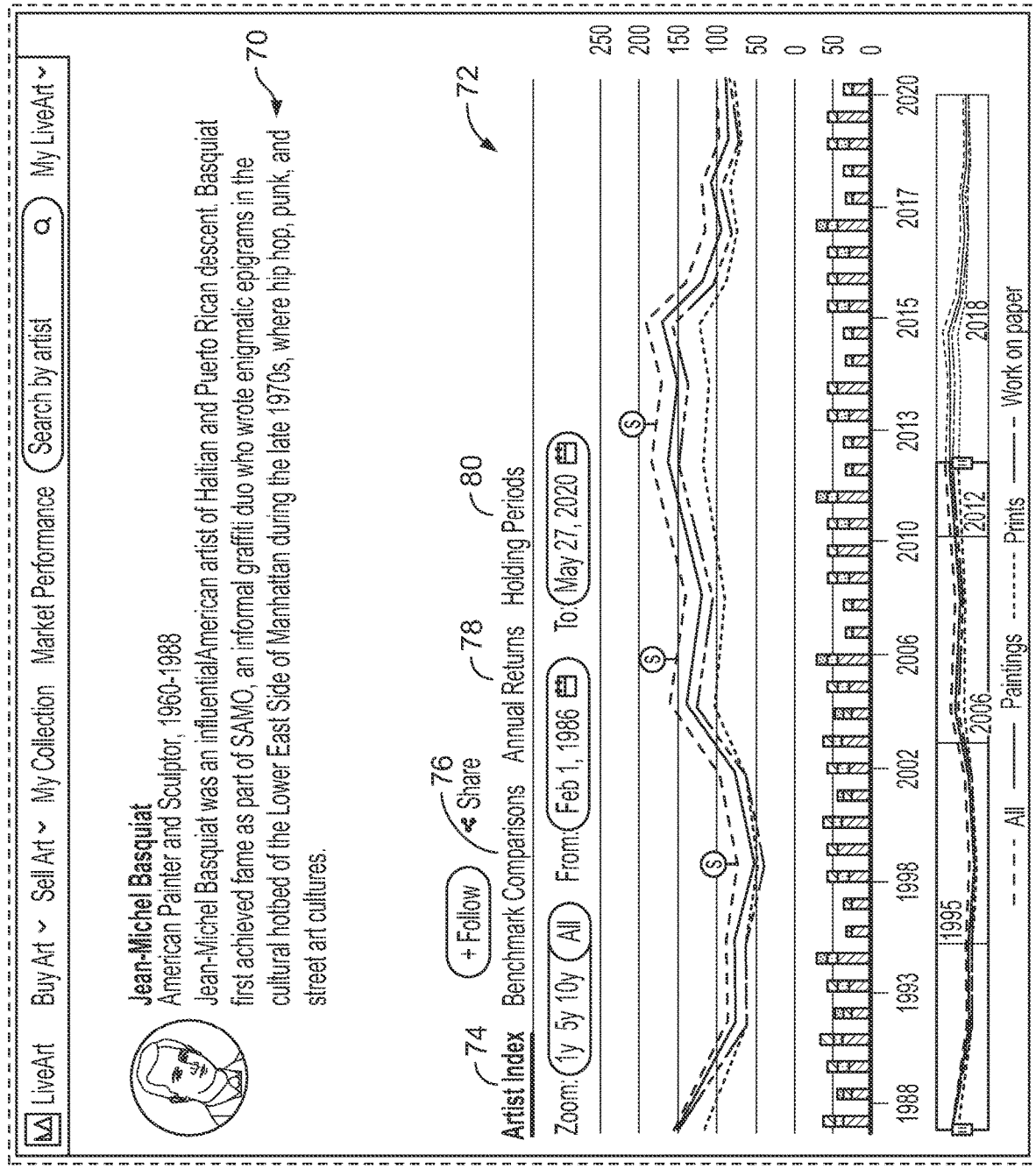

FIGS. 2A and 2B illustrate an example of a page that is presented to a participant who invokes an entry in section 22 of FIG. 1A, for example, the entry for Jean-Michel Basquiat. Three sections are presented in FIGS. 2A and 2B: A section 70 presents biographical information about the artist. A section 72 provides price index information about the artworks of the artist. And section 74 presents panels 76 of artworks of the artist in a format like the one shown in FIGS. 1A and 1B. The section 72 presents index changes over time, bar graphs of volume of sales, and a slider for adjusting the time period represented on the graph. A set of tabs can be invoked including a tab 74 which is the one shown on the figure, a tab 76 to invoke benchmark comparisons of the index performance with respect to this artist and his artworks and other artists and other artworks and financial indicators such as S&P 500, an annual returns tab 78 to show the annual return on individual artworks or groups of artworks of this artist, and a tab 80 to illustrate the holding periods for respective artworks of this artist. Section 74 of the page includes filter controls. A control 78 can select from different ranges of current prices. A control 80 can select from ranges of estimated current prices. When filter settings are changed, the selection of artworks presented in the gallery change accordingly.

Many of the pages of the user interface present artwork entries in a gallery or a list or in other ways. A participant can invoke such an entry on any page or in any section and be presented with an artwork page that displays information about that artwork. In effect then, any artwork in the full catalog can be the subject of such a presented page.

Figure 3A:
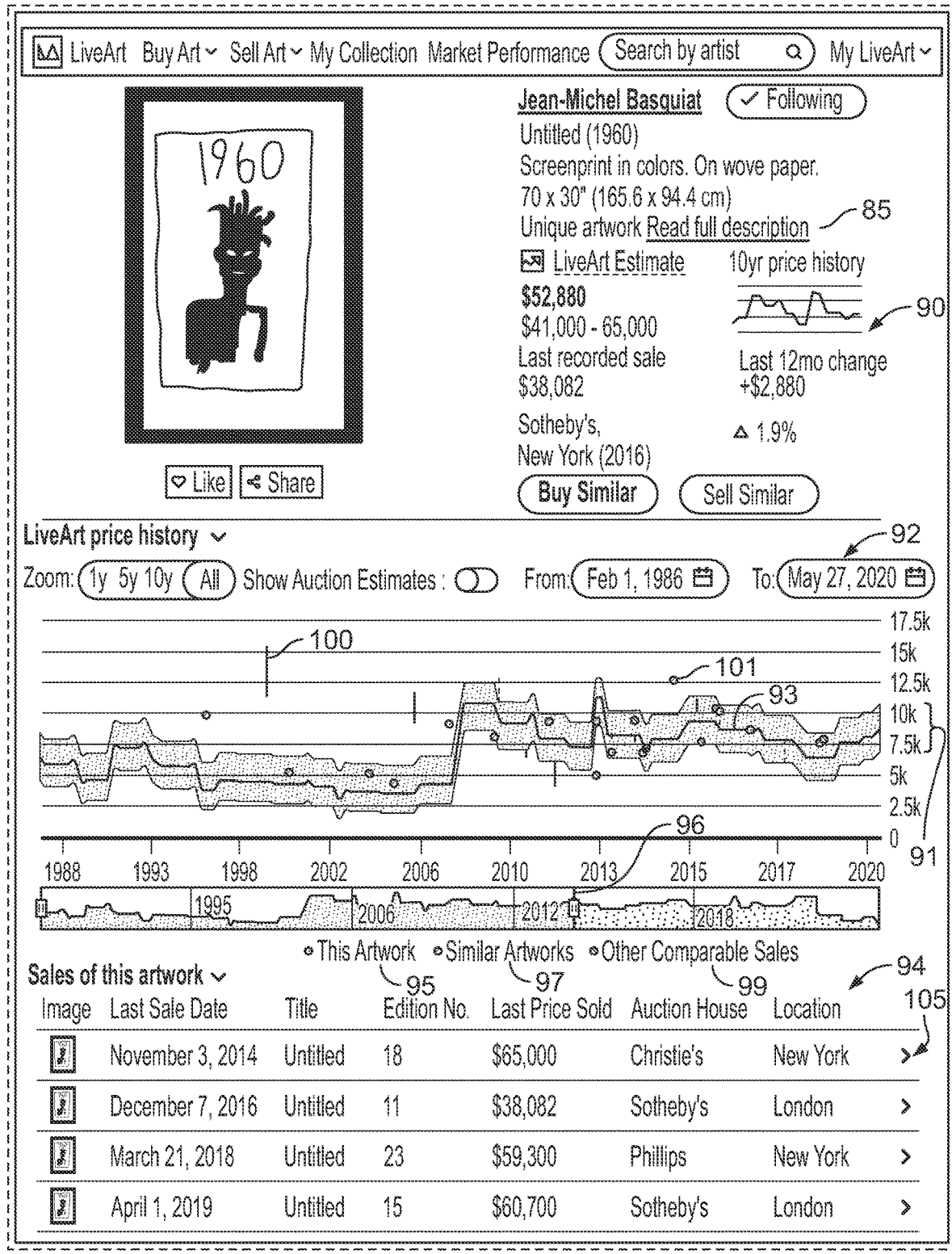
Figure 3B:

An example of an artwork page is shown in FIGS. 3A and 3B. The page includes a section 90 summarizing the artwork and its prices. A section 92 reveals price history information. A more detailed description of the artwork is presented in section 96, and a gallery of similar artworks is presented in section 98. Section 90 includes an estimated current price a 10-year price history, a last recorded sale price, and a 12 month change in the price. In section 92, a graph of the price and price ranges 91, 93 over a time period selected by the participant are shown along with markers 101 that show prices and dates of sales of the artwork and are shaded according to the key including this artwork 95, similar artwork 97, and other comparable sales 99. The bars 100 represent auction price estimates. Each entry 105 of the section 94 reports data for the most recent sale of respective edition numbers for the artwork, the date of the sale, the price of the sale, the auction house, and the location. In section 98 the artworks included in the gallery are determined by the enhanced online market technology based on their similarity to the artwork covered by this page. The participant can use controls 102, 104, and 106 to specify attributes of the artworks in the catalog of artworks to be used in determining similarity. Here the attributes are visual characteristic, size and materials, and financial performance. The degree of similarity is determined by the enhanced online market technology based on a variety of factors. In effect, the gallery shown in section 98 represents a region of the multi-dimensional space spanned by the catalog of artworks.

Figure 4A:
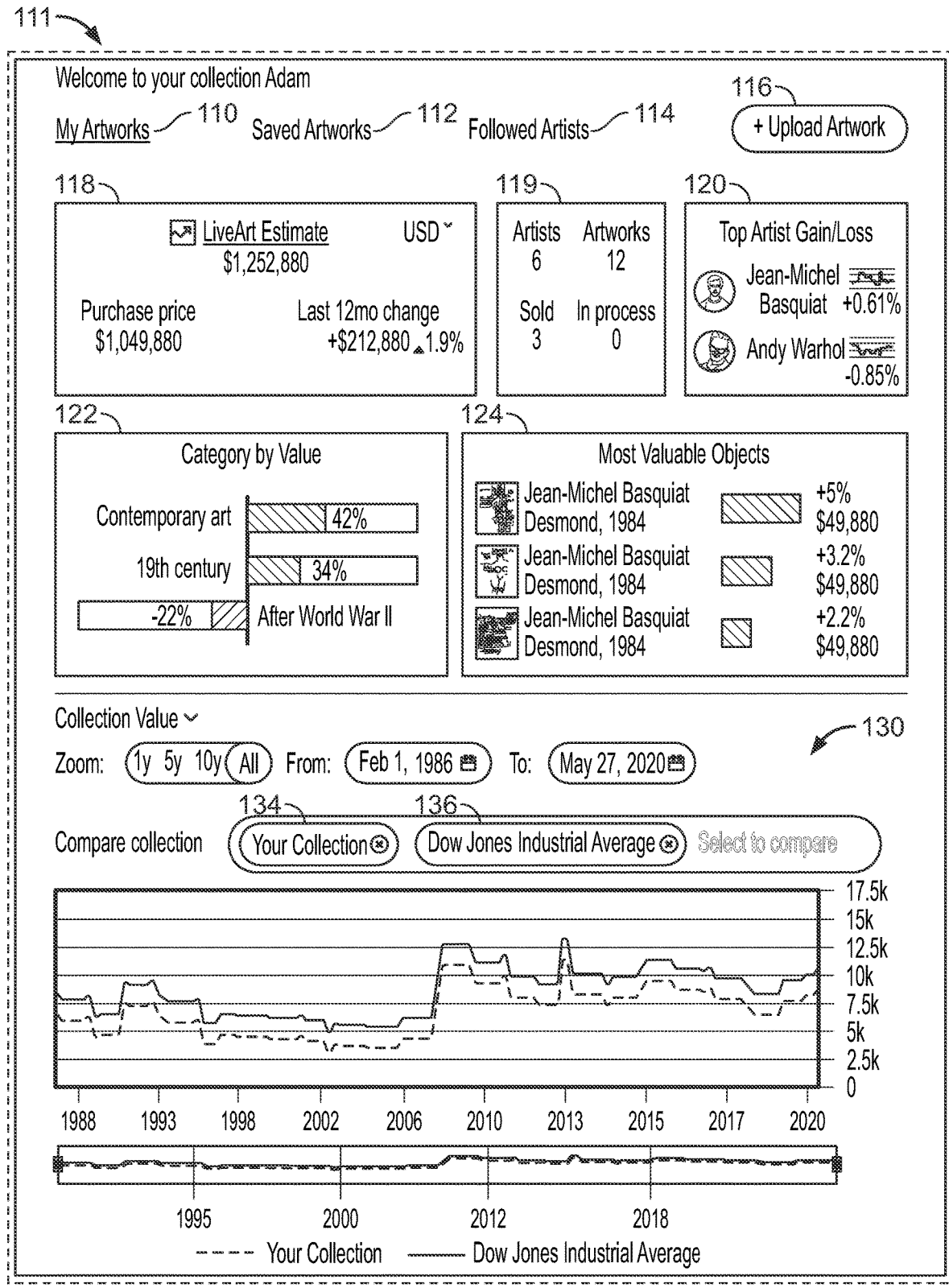
Figure 4B:
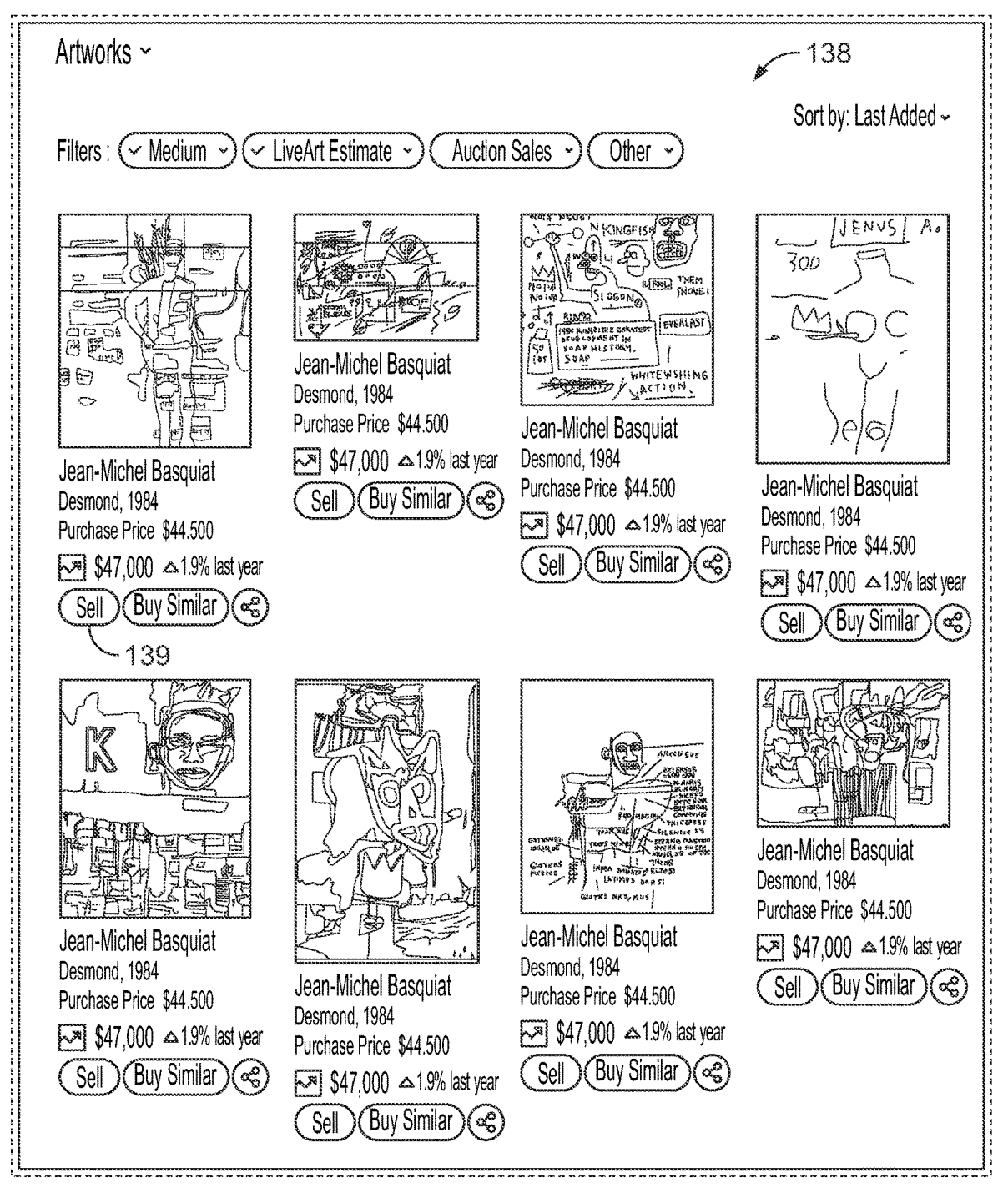

The page shown in FIGS. 4A and 4B is an example of a page reached by a participant by invoking the menu item 14 (my collection). This page provides information about a virtual collection (portfolio) of artworks maintained by a participant on the enhanced online market for artworks. The virtual collection (portfolio) may but need not conform exactly to a real collection of artworks owned by the participant. In some examples, the collection is a hypothetical collection of interest to the participant, for example. This page includes a summary section 111, a value section 130, and an artworks section 138. The summary section includes a financial panel 118 showing an estimated value of the collection, a previous estimated value (say 12 months earlier) and a change in value. A panel 119 summarizes the artworks in the collection. Percentages of gain or loss in value in the past 12 months for artworks of the top artists in the collection are presented in a panel 120. Panel 122 reports values of artworks in the collection representing specific genres or time periods, for example. The most valuable individual artworks are presented in a panel 124. In the section 130 the participant can select one or more of the participant's collections or other collections using controls 134 and 136 and be presented with graphs showing and comparing the value performance of the collections. The section 138 shows a gallery of artworks similar to ones discussed for other pages. Here the controls offered to the participant include a sell control 139. When the sell control is invoked, the participant is presented with pages that enable listing the corresponding artwork and then engaging in steps ending with a sale transaction.

The collection of a participant can include not only artworks selected by the participant for inclusion in a portfolio but also artworks that have been saved by the participant for possible later market activities. The participant can also follow artists of interest. At the top of the page, the participant can invoke controls 110, 112, or 114 to select which set of artworks should be presented, either the participant's portfolio (my artworks), saved artworks, or artworks of followed artists. By invoking the upload artwork control 116, a participant can add a record to his collection (and accordingly to the catalog) about an artwork not already included in the catalog.

In addition to the pages described above the user interface served by the enhanced online market technology also provides market pages that implement an artwork market in which a variety of market activities can be performed by participants as buyers and sellers before, during, and after sale transactions for artworks. A participant can navigate to the market pages by, for example, invoking the buy art or sell art controls 10 or 12 shown on page 1A (and elsewhere on the user interface).

Figure 5A:
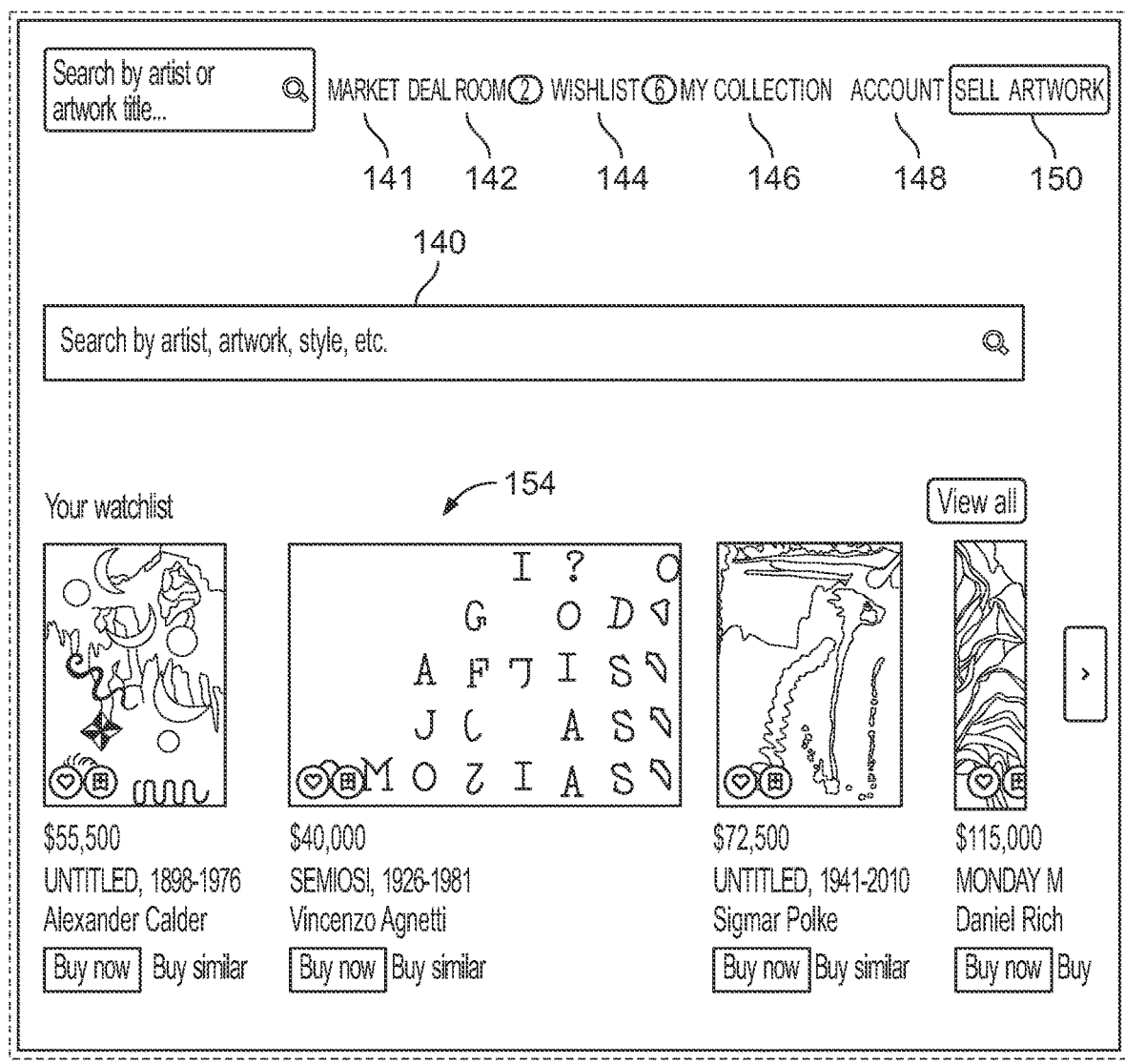
Figure 5B:
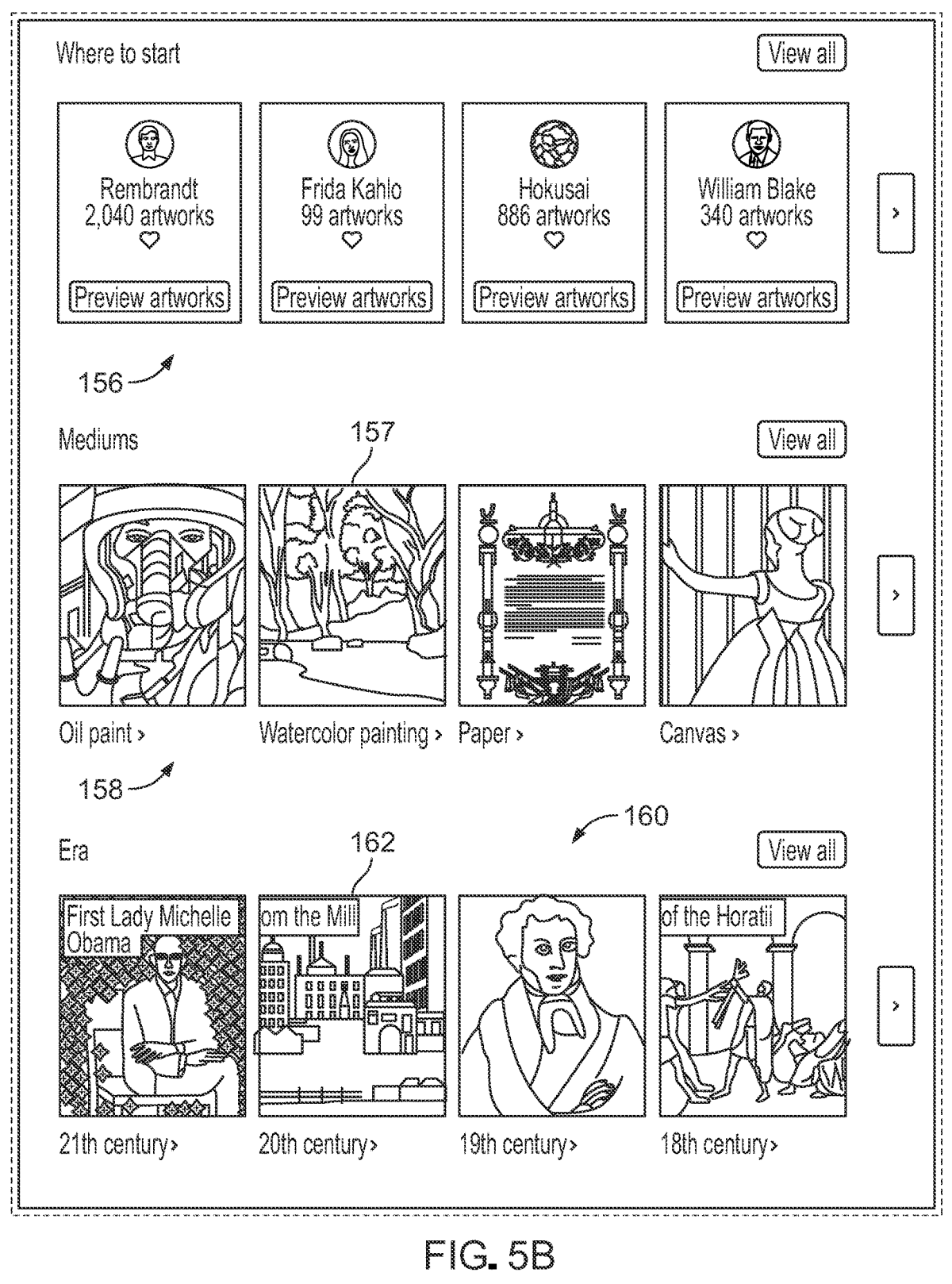

The page shown on FIGS. 5A and 5B is an example of a market page, in this case a page that might be used by a potential buyer or other participant to search for and navigate the artworks in the catalog that are consigned and available for sale. The page includes a search box 140 and a section showing the participant's watch list of artworks that the participant may be interested in buying (and buy now controls next to each of the entries 154 in that section). A section 156 presents entries for a selected set of artists that may be of interest to the participant, each entry including a preview artworks control that enables navigation to a gallery of artworks by that artist. In a section 158 entries 157 on different mediums can be invoked to view galleries of consigned artworks for which the medium attribute has the indicated value (say, watercolor painting), Section 160 similar has entries 162 that enable navigation to galleries for different identified eras.

The page of FIGS. 5A and 5B also includes a navigation bar having controls for reaching the art market home page 141, proceeding to a deal room 142, going to a wish list of the participant 144, getting to the participant's collection 146, and reviewing information about the participant's account 148. A control 150 enables the participant to proceed immediately to pages that enable the listing and selling of artworks.

Figure 6:
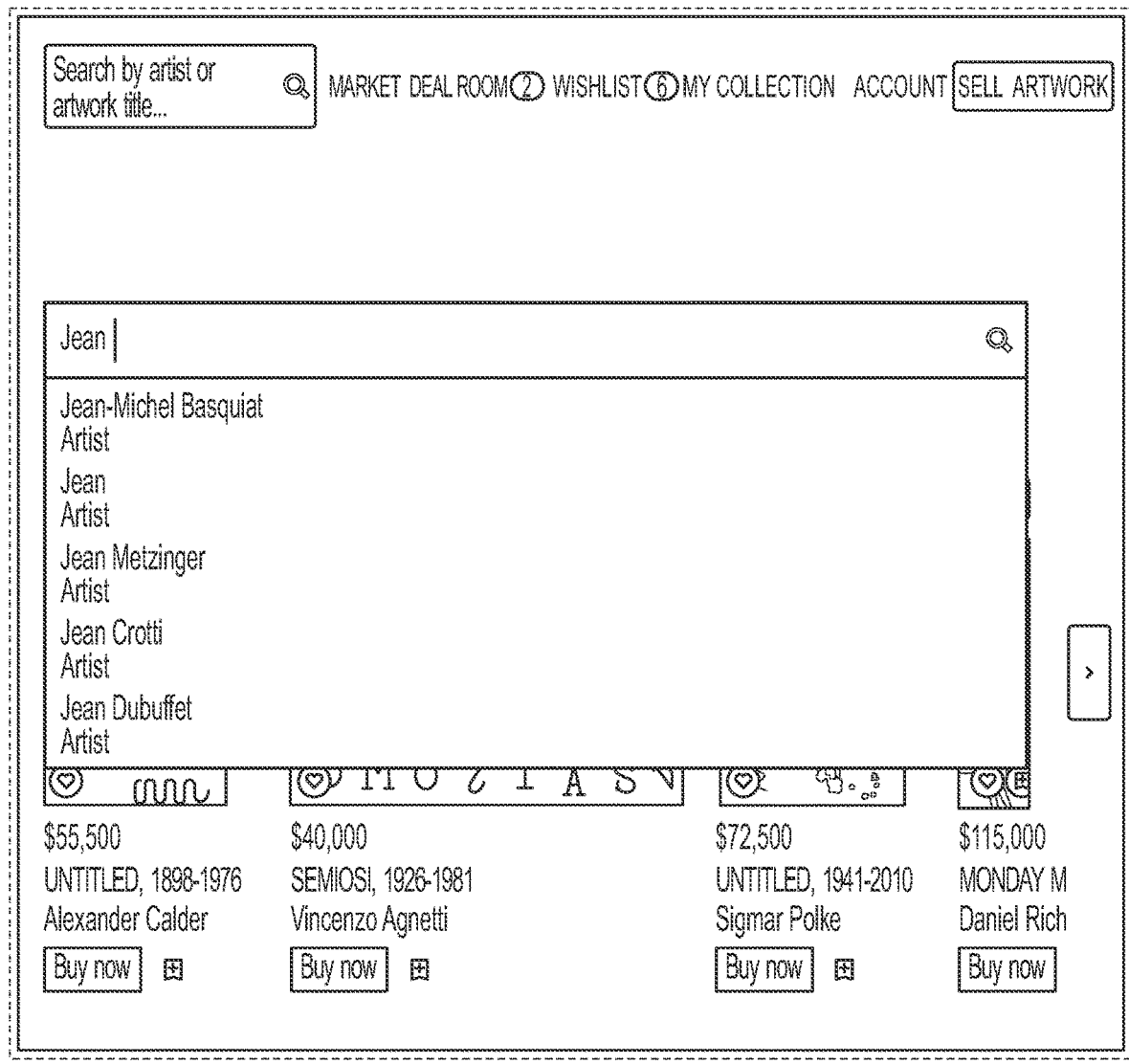

FIG. 6 is the upper half of a page showing how the entry of letters of the name of an artist, for example, yields a list of suggestions. Other attributes can be entered in the search box to yield other suggestions appropriate for those attributes. (The bottom half of the page shown in FIG. 6 is the same as FIG. 5B.)

Figure 7A:
Figure 7B:
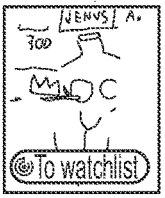

For example, if the participant searches for and then invokes a particular artist (in this case, Jean-Michel Basquiat), the page shown in FIGS. 7A and 7B is presented to provide market data and other information about the value performance of artworks by that artist. Statistical information is shown in section 170. Graphs 172 show value performance of the artist compared to, in this example, value performance of the S&P 500. The value performance of the artist, annotated to show the timing of life events and other events, is shown in graphs 173. A filter facility 178 enables a participant to explore the artworks of this artist that are in the catalog and can be bought, in a gallery 182. The section 184 presents a gallery of works by the artist that are in the catalog but are not consigned for sale.

When a participant invokes the deal room control 142, a page such as the my deals page shown in FIG. 8 can be presented. Deals (for example, sale transactions) on the enhanced online market for artworks can be in various deal states at a given time. The deal states can include, for example, buying, bought, selling, and sold and other finer grained states within those states. Navigation controls 194 can enable the participant to see, selectively, all of the deals in which the participant is involved (which is the control invoked in the example shown in the figure), deals of the participant that are in a buying state, deals of the participant that are in a selling state, and deals that are completed.

FIG. 8 presents panels 204, 208, and 210 each representing an artwork that is subject to a deal, the deal state, and other information about the deal. Indented below one or more panels is a subpanel of information 206 about market activities associated with the deal for the artwork.

In panel 204, the artwork is being offered for sale (the deal is in the buying state 198 with respect to this participant). The image is hidden 196 and the title is hidden 200 based on conditions of the deal at this state as specified by the seller participant. A price range 204 is also presented. The subpanel 206 reports that this participant's request to view artwork details is pending.

Panel 208 shows information about an artwork sold by this participant, including the markdown from the offered price to the sold price and the state of the deal ("money has been transferred to your account"). Panel 210 shows information about an artwork bought by the participant.

Figure 9:
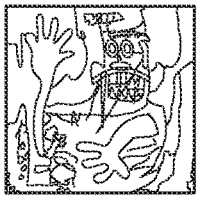
Figure 13A:
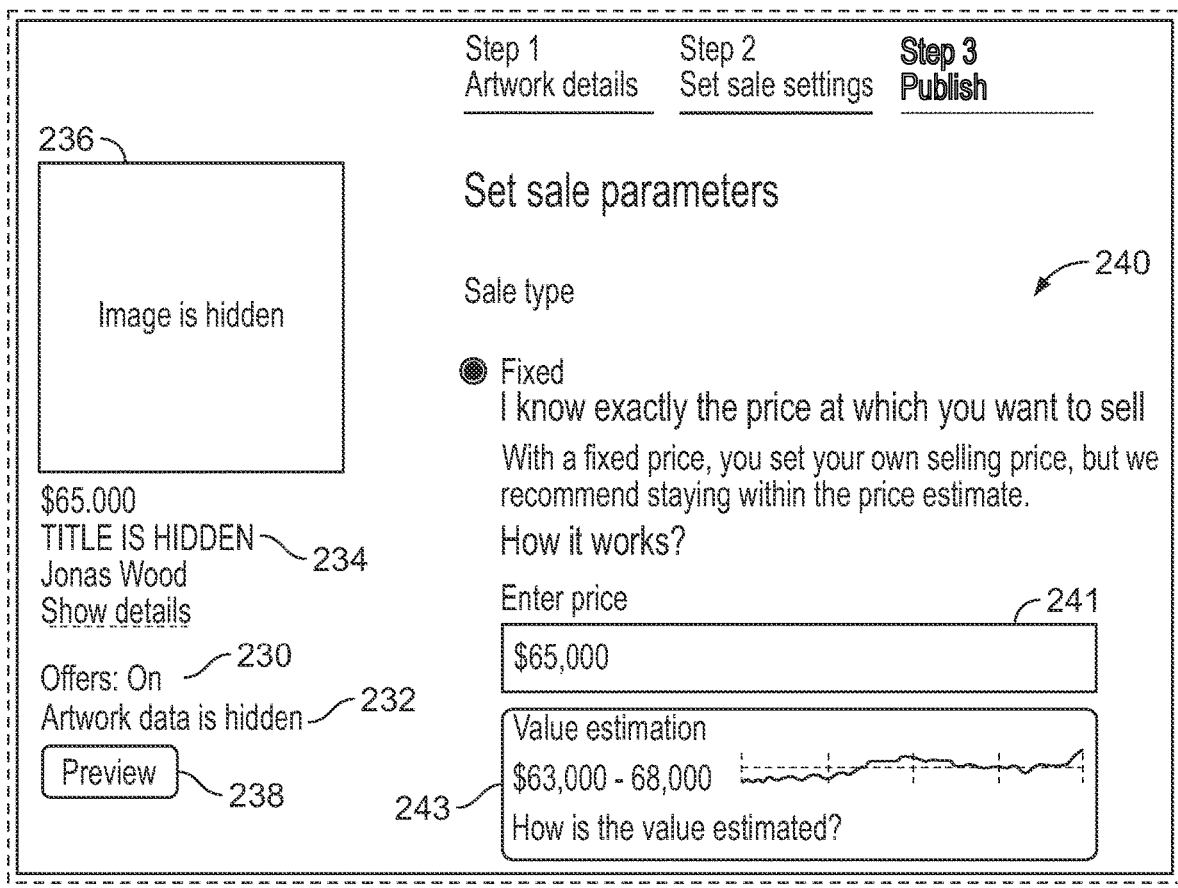

FIG. 9 shows a later deal state of the same deal in which the seller has approved the participant as a buyer and the participant is invited to make an offer by invoking button 207

Listing and Selling an Artwork

FIGS. 9 through 35 illustrate steps in the process of a seller participant listing and then selling an artwork.

Figure 40:
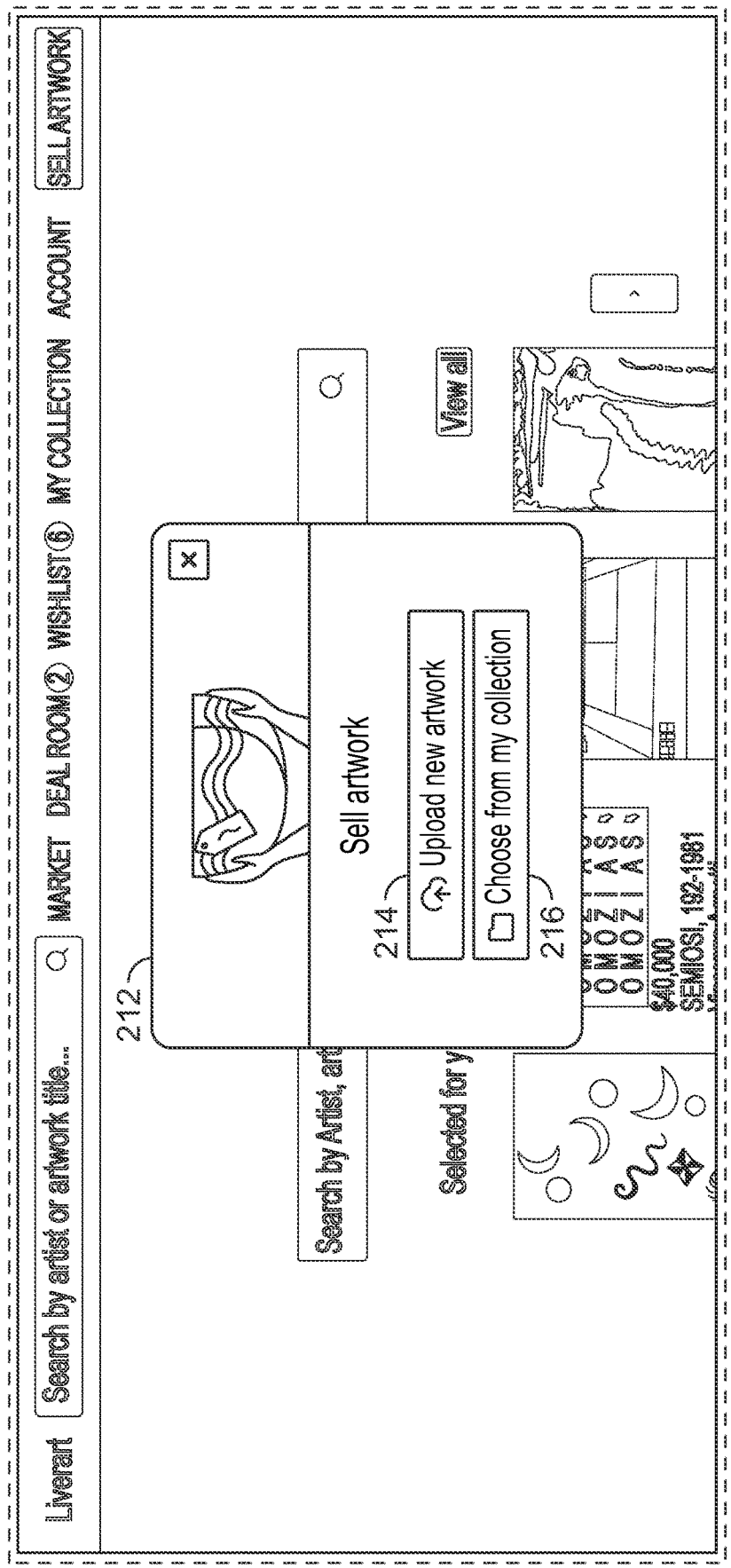

The dialog box 212 of FIG. 40 is reached when, for example, a participant who wants to list and sell an artwork invokes control 150 (FIG. 5A). The participant can proceed by either invoking the upload new artwork control 214 or the choose from my collection control 216.

When the upload new artwork control is invoked, the page of FIGS. 10A and 10B is presented. A listing form 219 including text boxes and other controls is used to complete information about attributes of the artwork to be offered for sale. When some or all of the attributes are provided a panel 220, 222 is presented to the participant to show the estimated price range of the artwork, a history of its value, and a control to be invoked to view more detailed analytics, such as value performance information. The participant is also given an opportunity in a section 224 to provide verification information about the artwork by uploading documents that establish ownership, valuation, authenticity, or other verification information. As shown in FIG. 11 (which is the bottom half of a page, the upper half of which is the same as FIG. 10A) the seller participant can select a type of damage to the artwork. The participant also can select a condition of the artwork by invoking a drop down list 223 to see several options 224 on FIG. 12.

Figure 14:
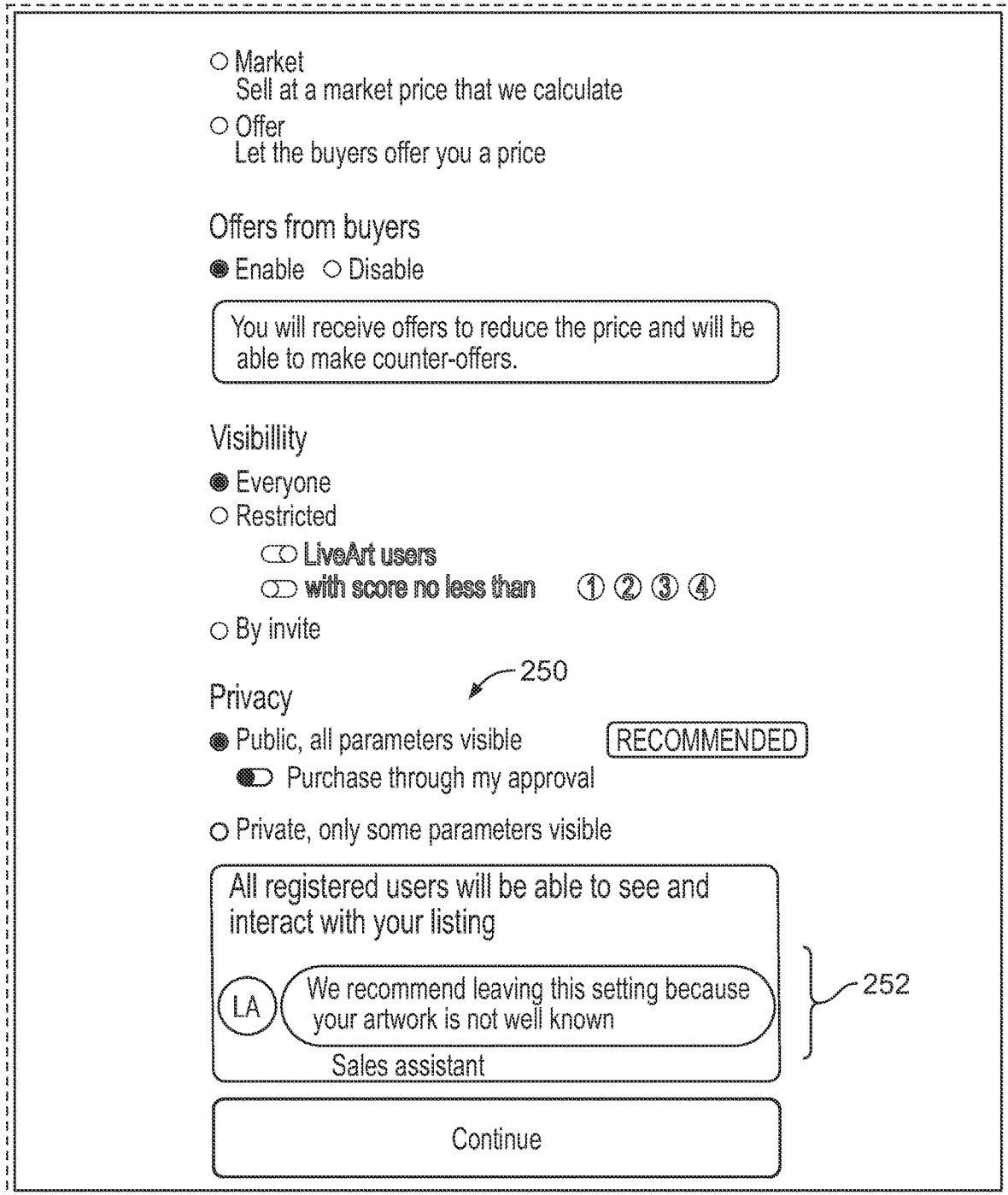
Figure 15:
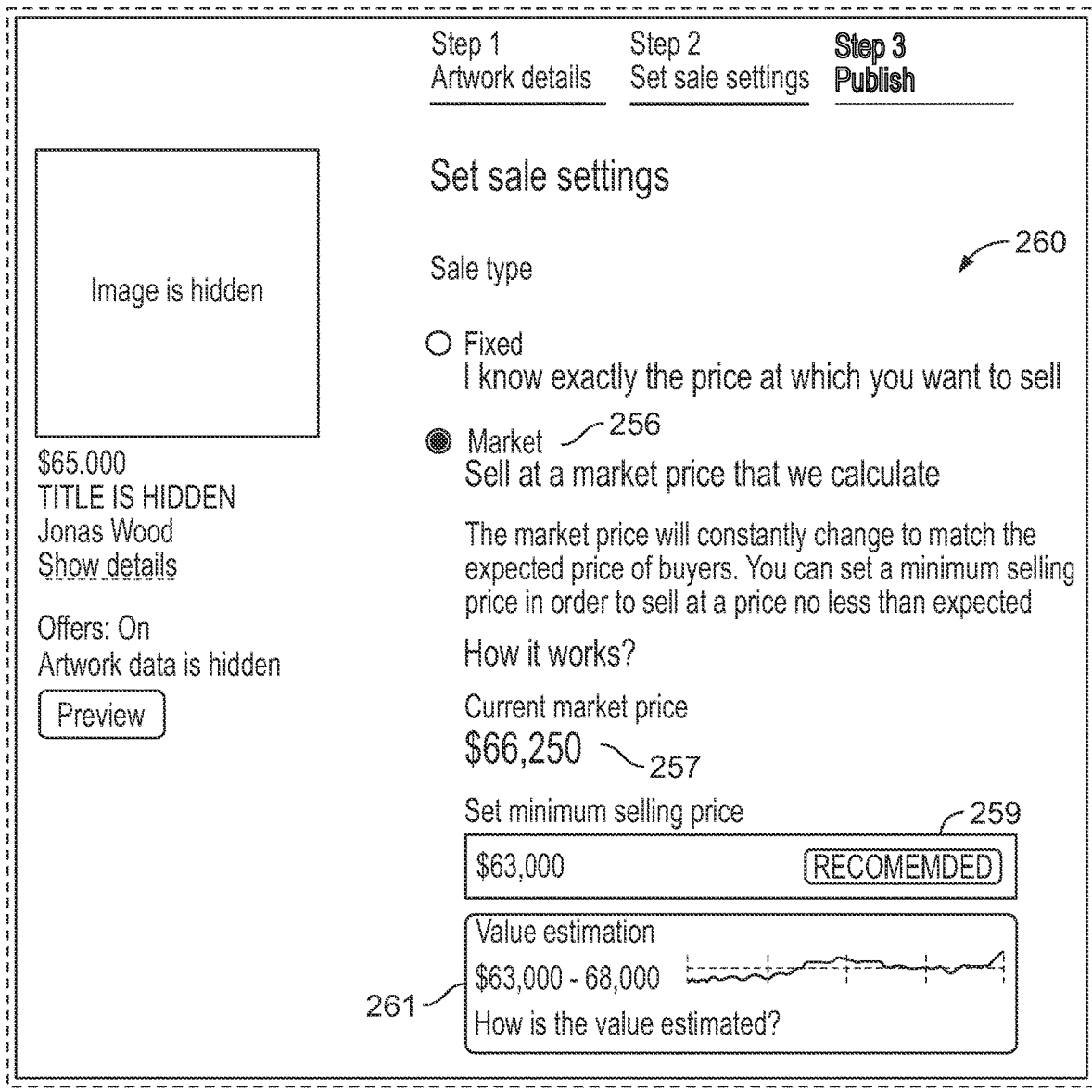
Figure 16:
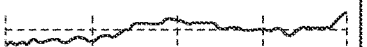
Figure 17:
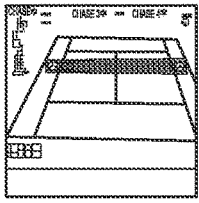
Figure 18:
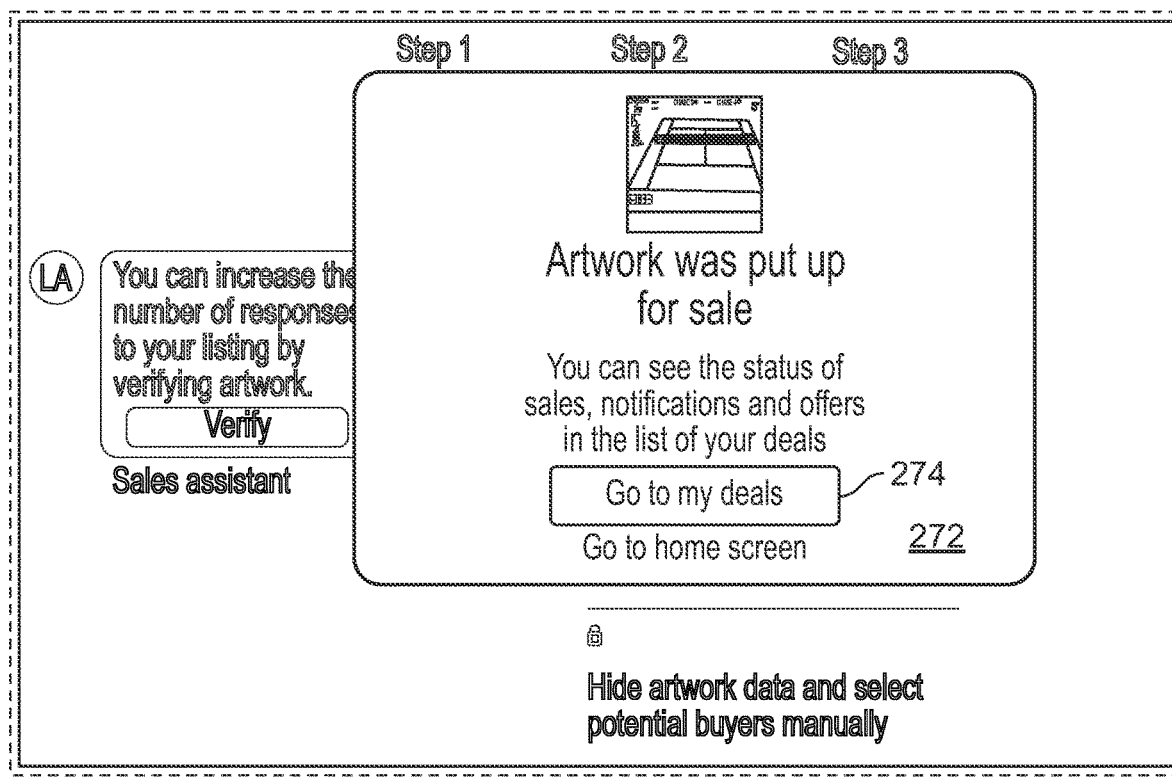

When the participant has completed the form and invokes the continue control 226, the user is shown a "set sale parameters" page which is shown in different possible states in FIGS. 13A and 13B, 14, 15, 16, 17, and 18. (FIG. 14 shows the bottom half of a page the top half of which is similar to or the same as FIG. 13A. FIGS. 16, and 17 show the top halves of pages the bottom halves of which are similar to or the same as FIG. 13B.) In the figures, the seller participant can set the type of sale. The choices include a fixed price sale 240, a sale at the market price 260, and a sale type 266 that is similar to auction in that buyers make offers and the seller chooses the best of the offers.

As shown in these figures, information about the listing of the artwork is presented on the left side including an image 236 or indication that the image will be hidden from buyers, a title 234, an indication offers can be made 230, and a preview control 238 for viewing additional information about the listing. On FIG. 13A, the seller participant can enter a price in control 241 and is shown a recommendation that is determined by the enhanced online market for artworks. Information about an estimated price range and value performance of the artwork is presented in a panel 243. Control 242 enables the seller participant to specify whether negotiation by offers of buyers and counteroffers of the seller participant will be enabled. Control 244 enables the seller participant to specify which participants can see the listing. Privacy control 246 enables the seller to control whether all attributes or only some attributes of the artwork will be visible. If the all parameters control 247 is invoked, the seller participant can invoke control 250 to specify purchase through the seller participant's approval.

FIG. 14B also shows a panel 252 which also appears on other pages of the user interface. In panel 252 the enhanced online market technology presents a virtual sales assistant (e.g., an online adviser) that provides information and makes context sensitive recommendations useful to the participant.

As shown in FIG. 15, the seller participant can invoke the market control 256. The enhanced online market technology then presents the estimated current market price 257, the panel 261 reporting value performance of the artwork, and a control 259 for entering a minimum selling price, which is pre-populated by a value provided by the enhanced online market technology.

In FIG. 15, the seller participant can invoke the offer control to set a selling type in which buyer participants can make offers.

After the seller participant has entered all the information needed to complete the listing, the page of FIG. 17 is presented included details of the listing. If the information is correct, the seller participant invokes the control 271, sees the notification 272 of FIG. 18, and then can return to the deals page shown in FIG. 20 by invoking control 274.

FIGS. 19 through 29 show steps in one example of a sale transaction that begins when a listing is published and ends when the artwork has been paid for and delivered. FIGS. 19 through 29 show an example of pages presented through the user interface of the enhanced online market for artworks to a seller participant.

Figure 19:
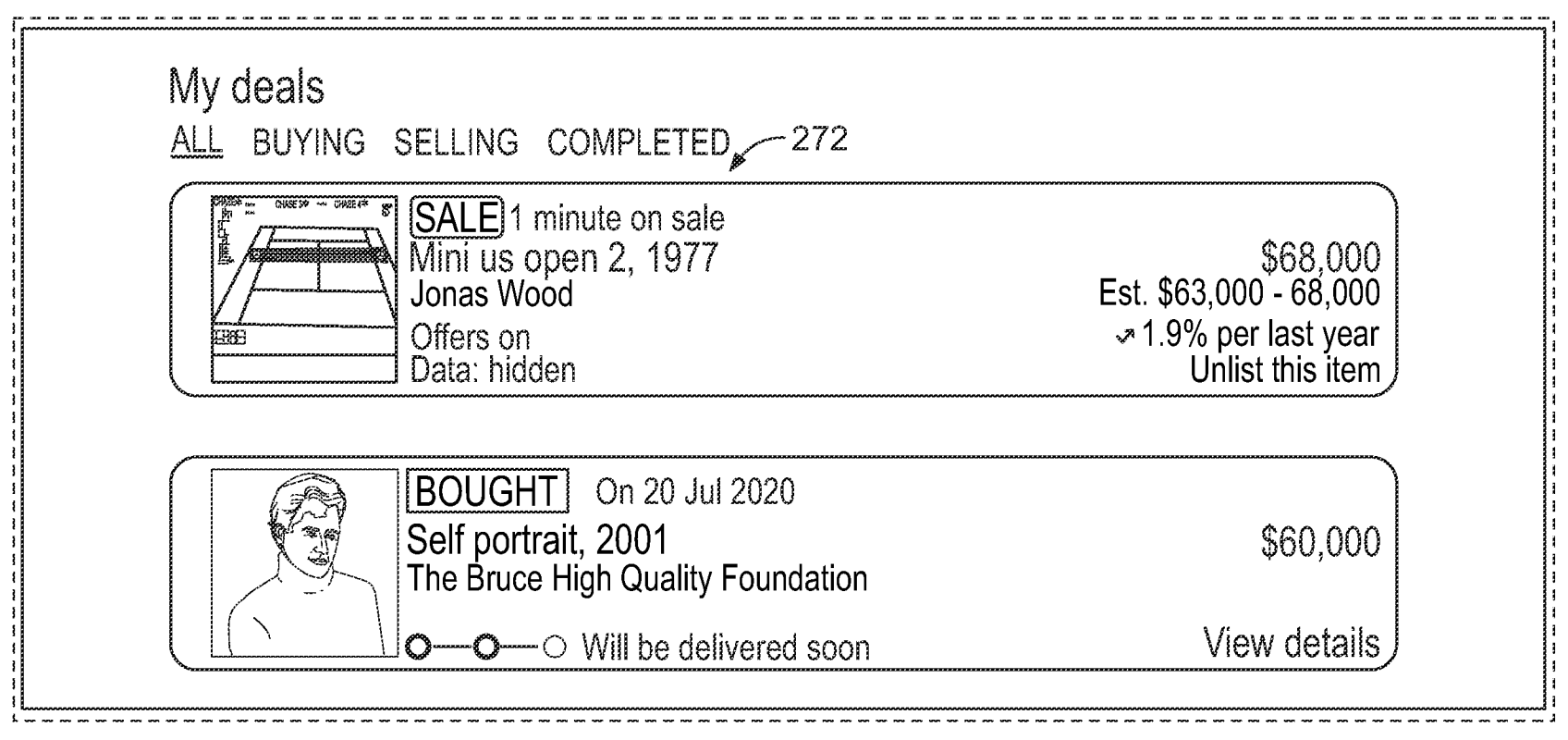

FIG. 19 shows a seller participant's summary view of his deals. Each deal is presented in a panel. Panel 272 reports an artwork of the seller participant that has just been published for sale and provides information about the listing.

Figure 20:
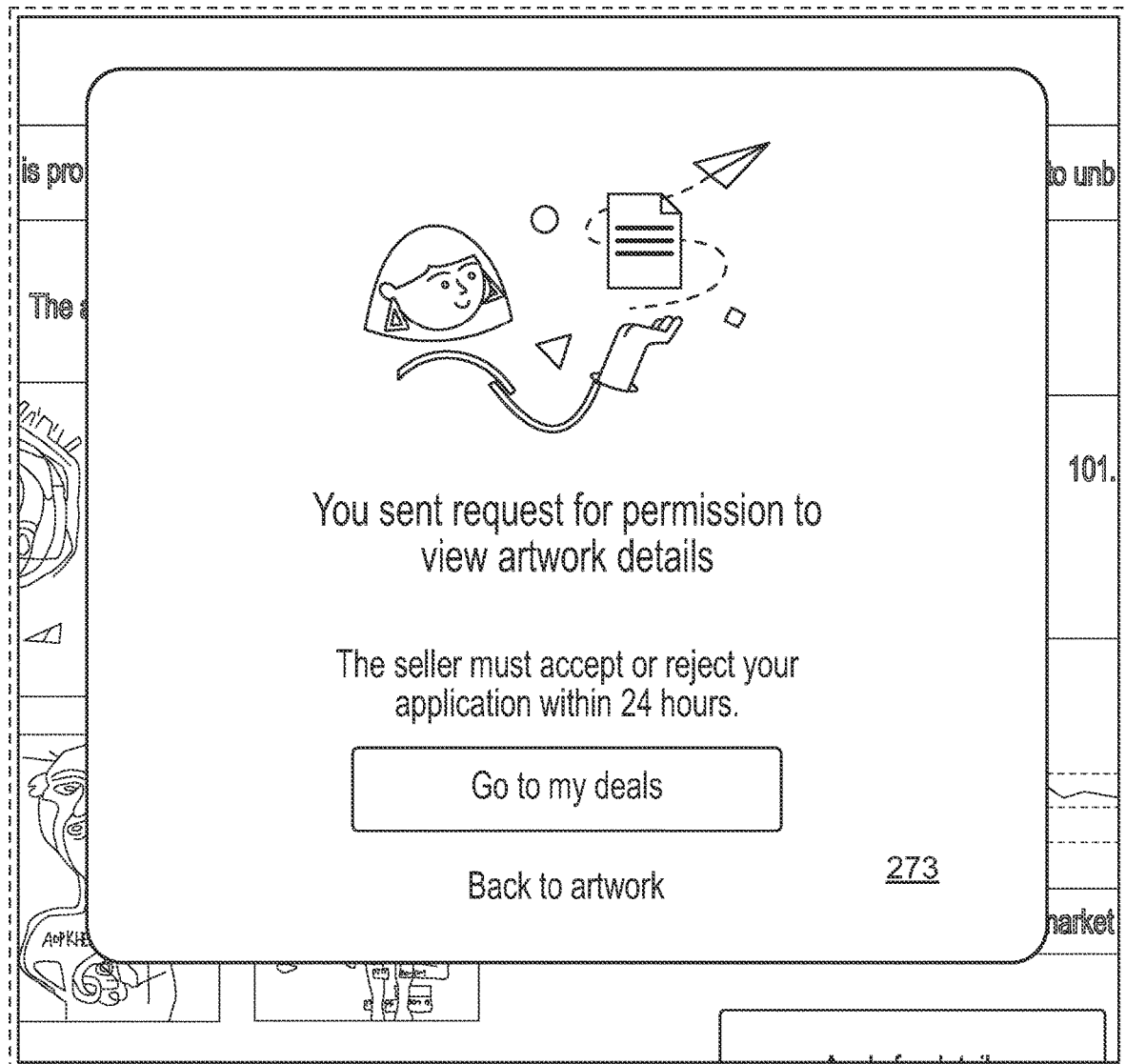

FIG. 20 shows a dialog box 273 presented to a buyer participant to confirm that the buyer participant has viewed the seller participant's listing (for which certain information is initially hidden) and has requested permission to view artwork details.

FIG. 21 shows the corresponding subpanel 274 presented to the seller participant to report the request of the buyer participant for details. The seller participant can invoke controls to either allow or deny the request, as shown. If the seller participant has allowed the request, his my deals page (FIG. 22) then reports the permission in a subpanel 276. A control 277 enables the seller participant to view a list of the buyer participants to whom viewing permission has been granted.

As shown in FIG. 23, if (after viewing the permitted details) a buyer participant makes a price offer, the subpanel 291 reports the offer to the seller participant and provides controls 293 enabling the seller participant to sell at the offered price or to make a counter offer. If the seller participant declines the offer, that is reported in panel 292 of FIG. 24. A control 297 enables the seller participant to change his mind and sell at the offered price.

Figure 25:
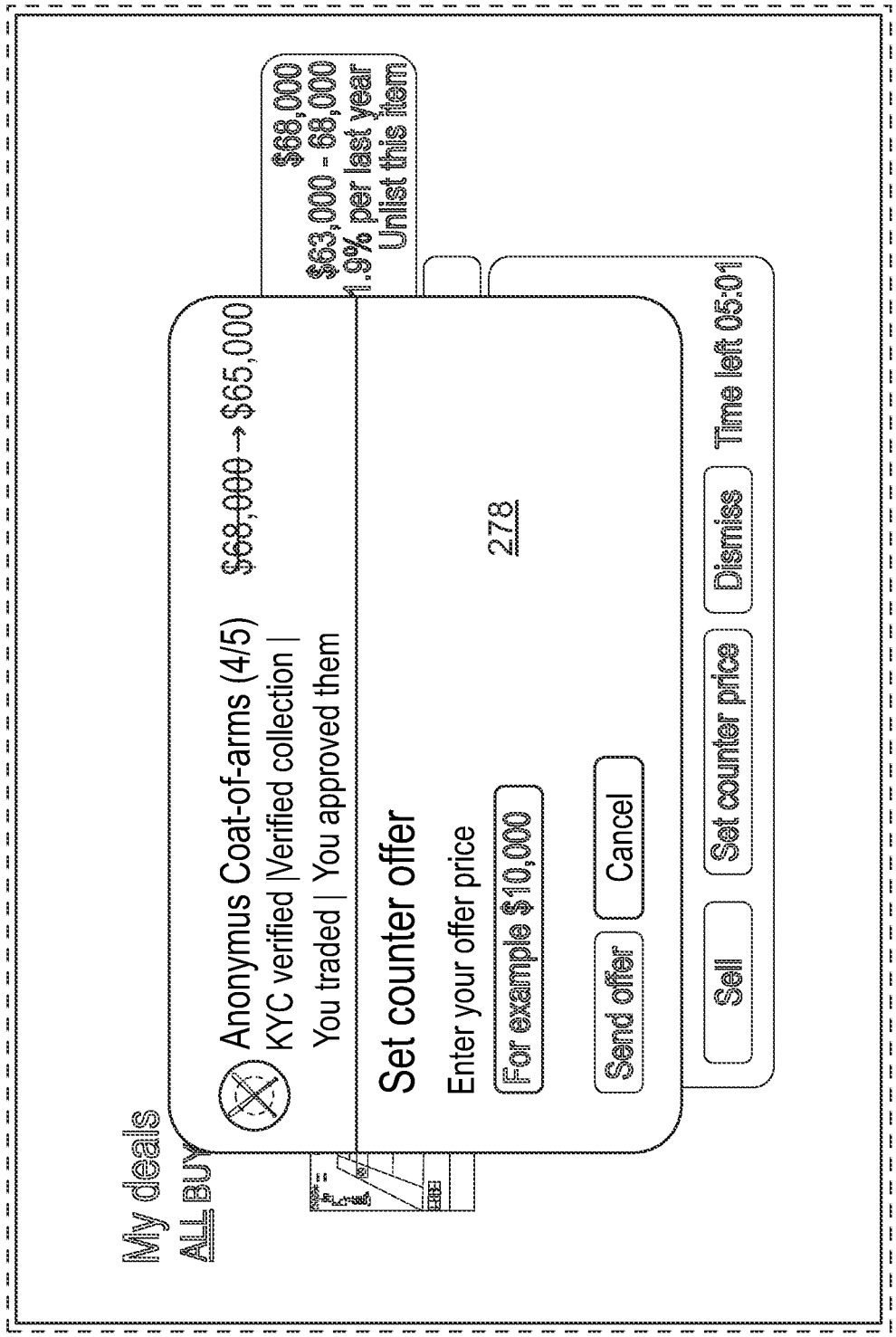
Figure 26:
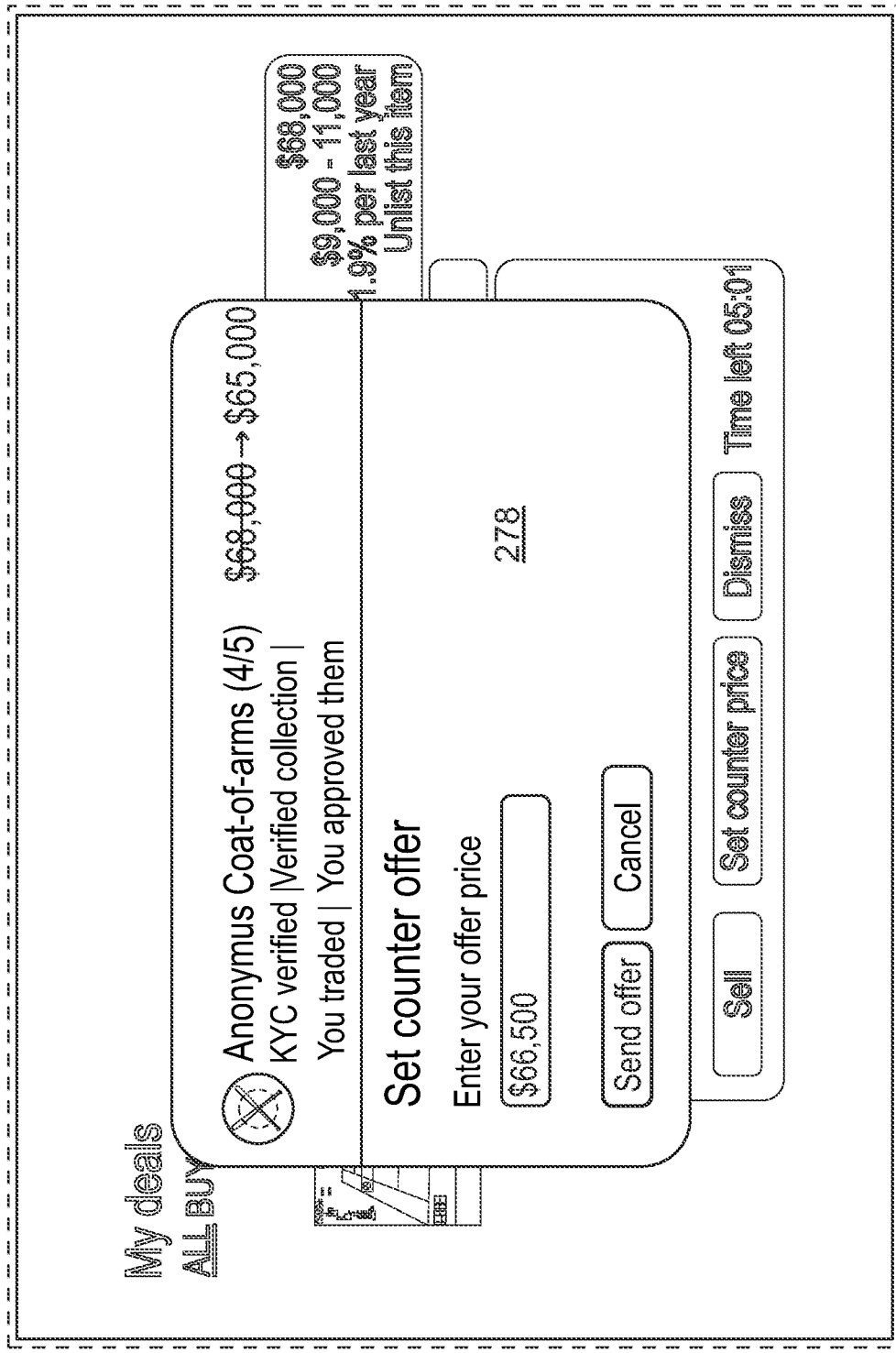
Figure 27:
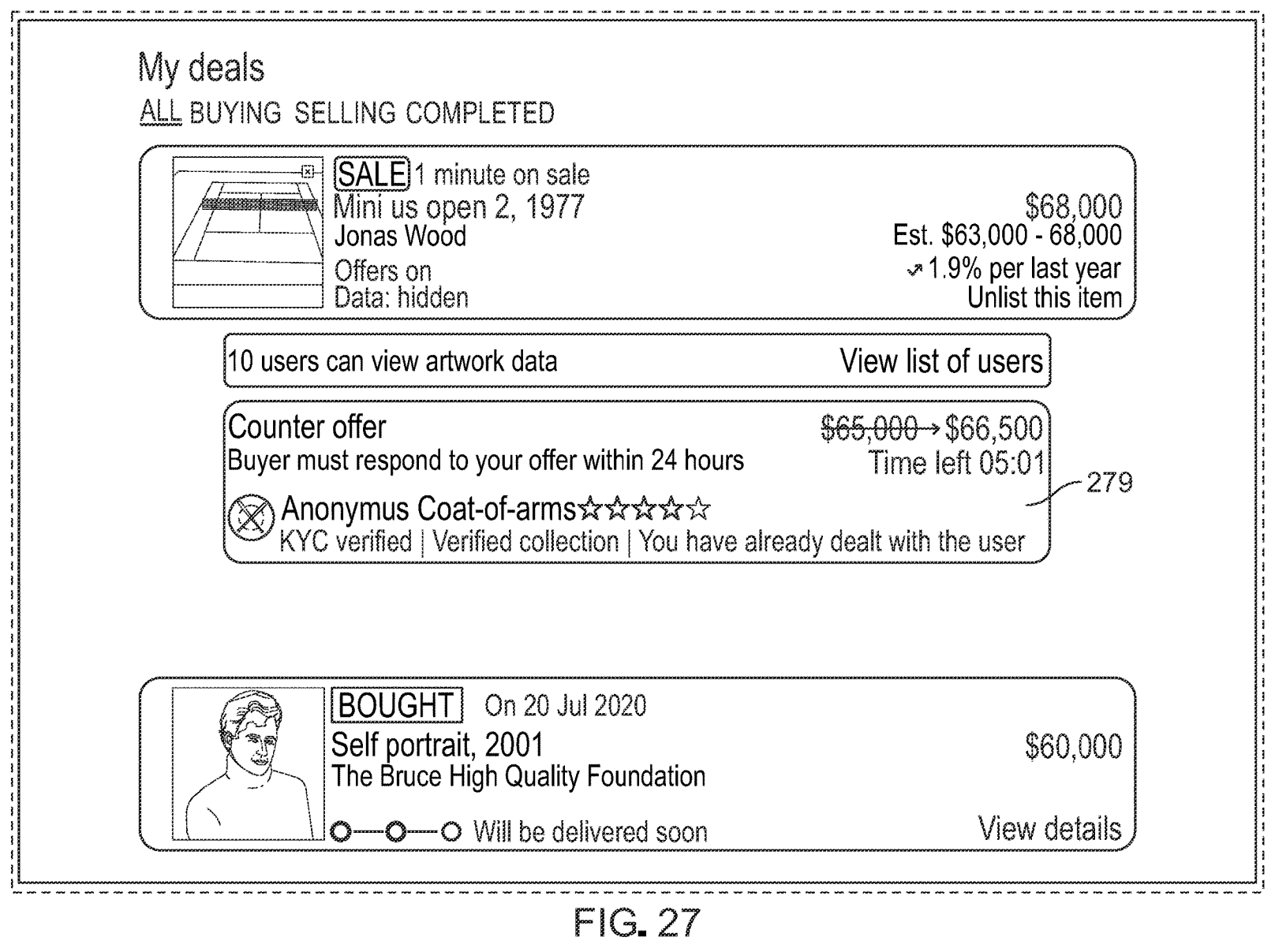
Figure 31:
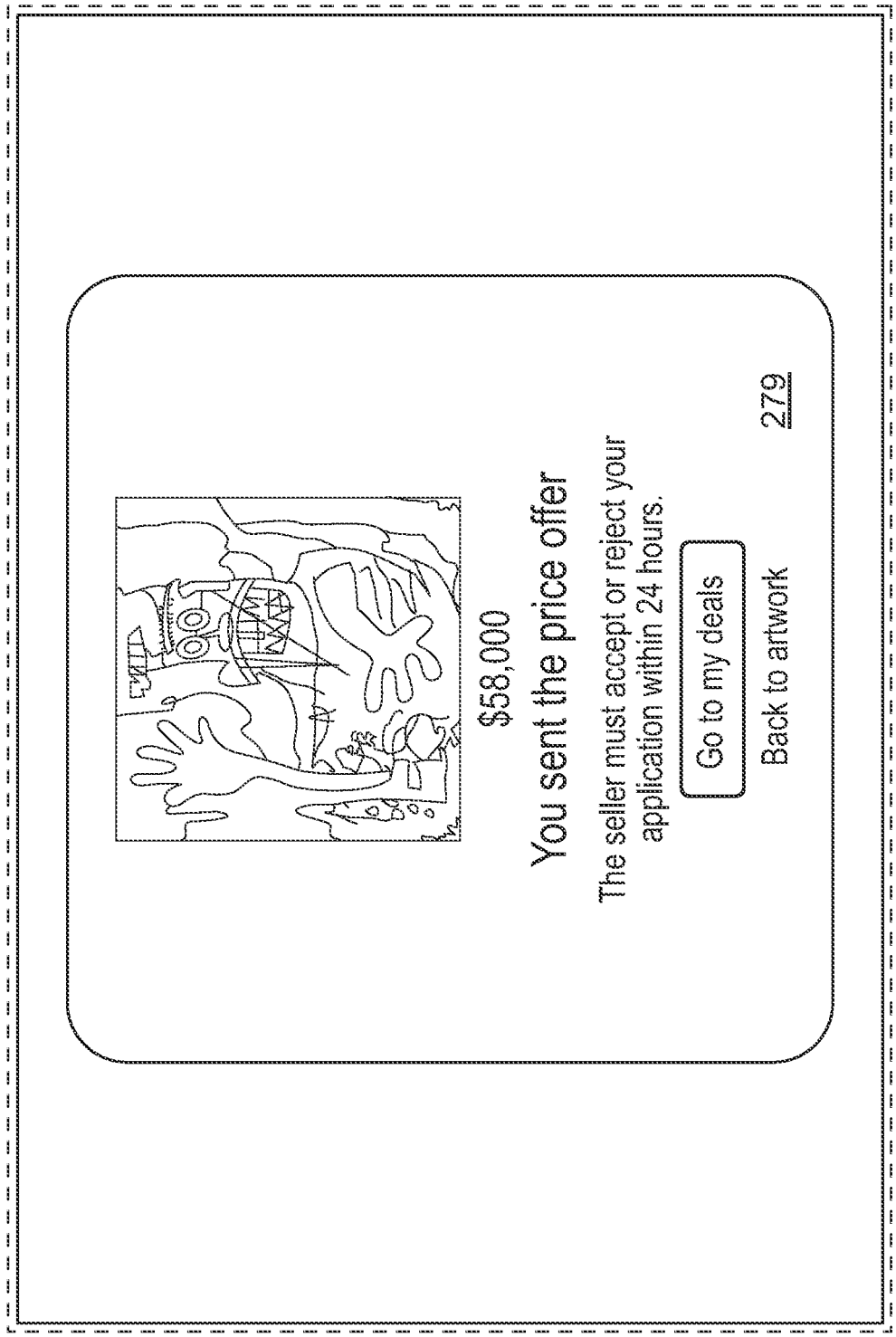
Figure 34:
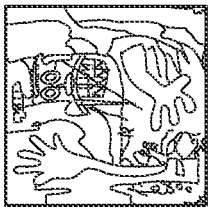

If the seller participant invokes the counter offer feature, the dialog box 278 of FIGS. 25 and 26 where the seller participant can enter a counter offer. Then the counter offer is reported in subpanel 279 of FIG. 27.

Figure 28:
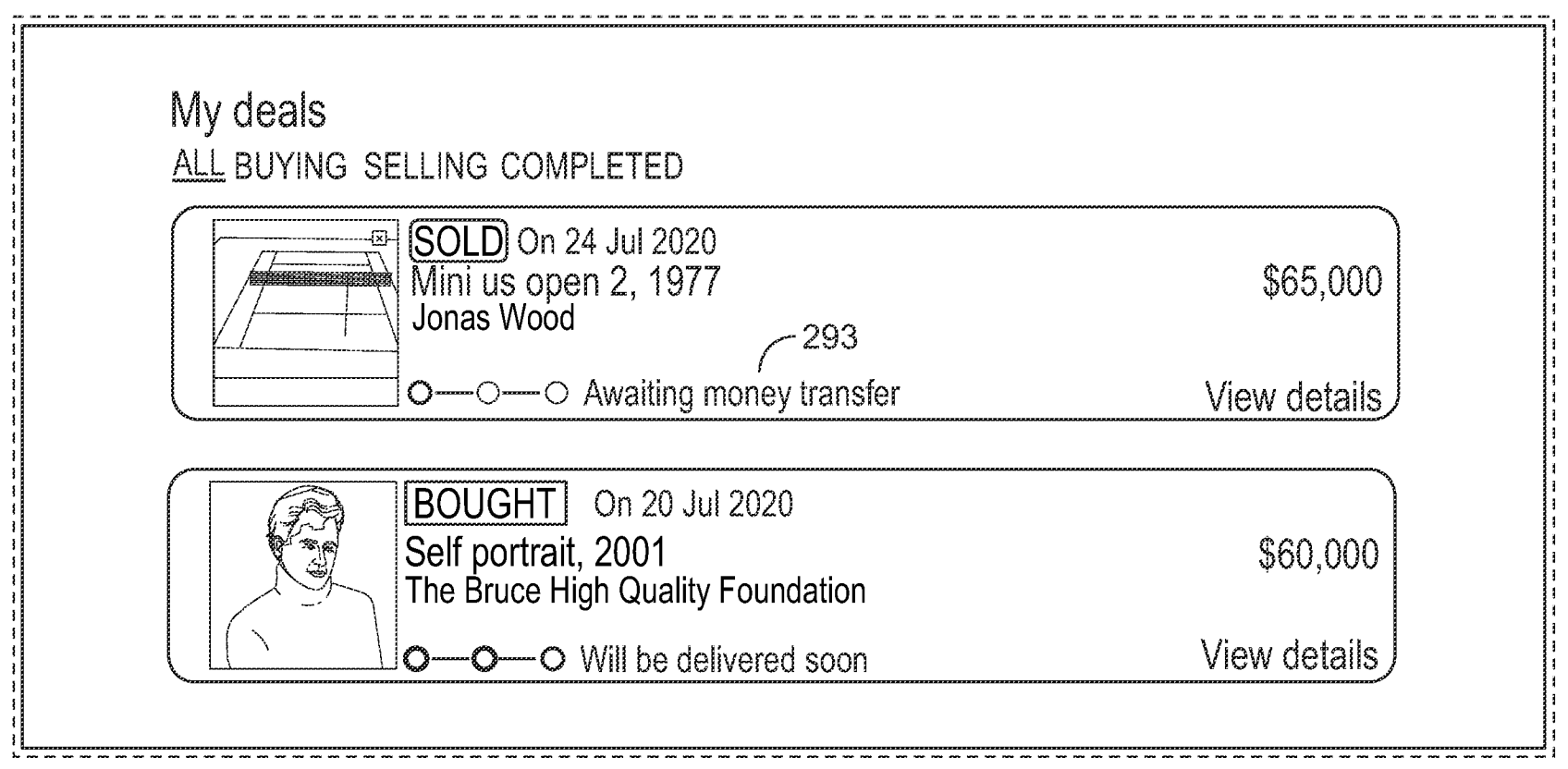
Figure 29:
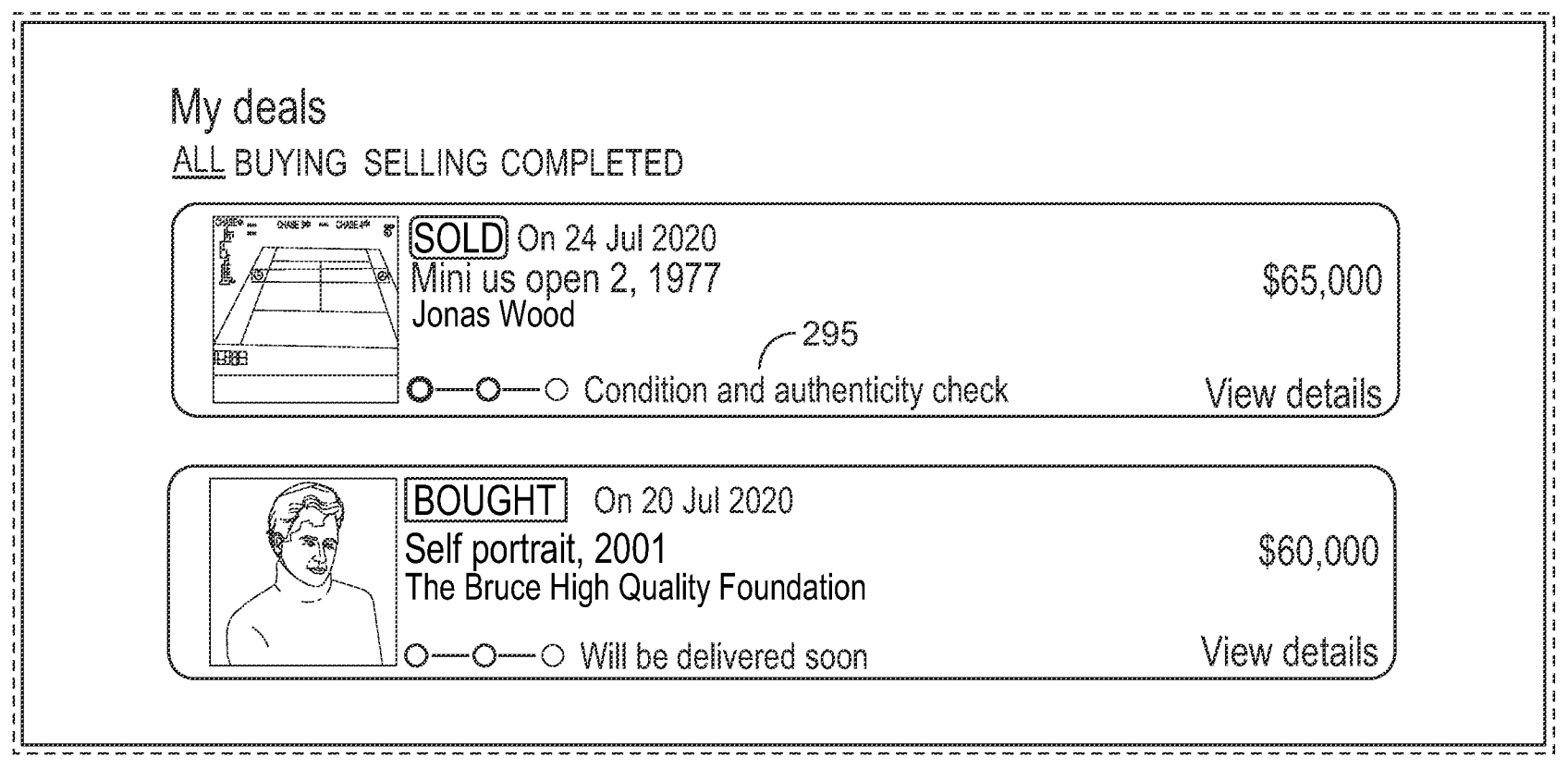
Figure 30:
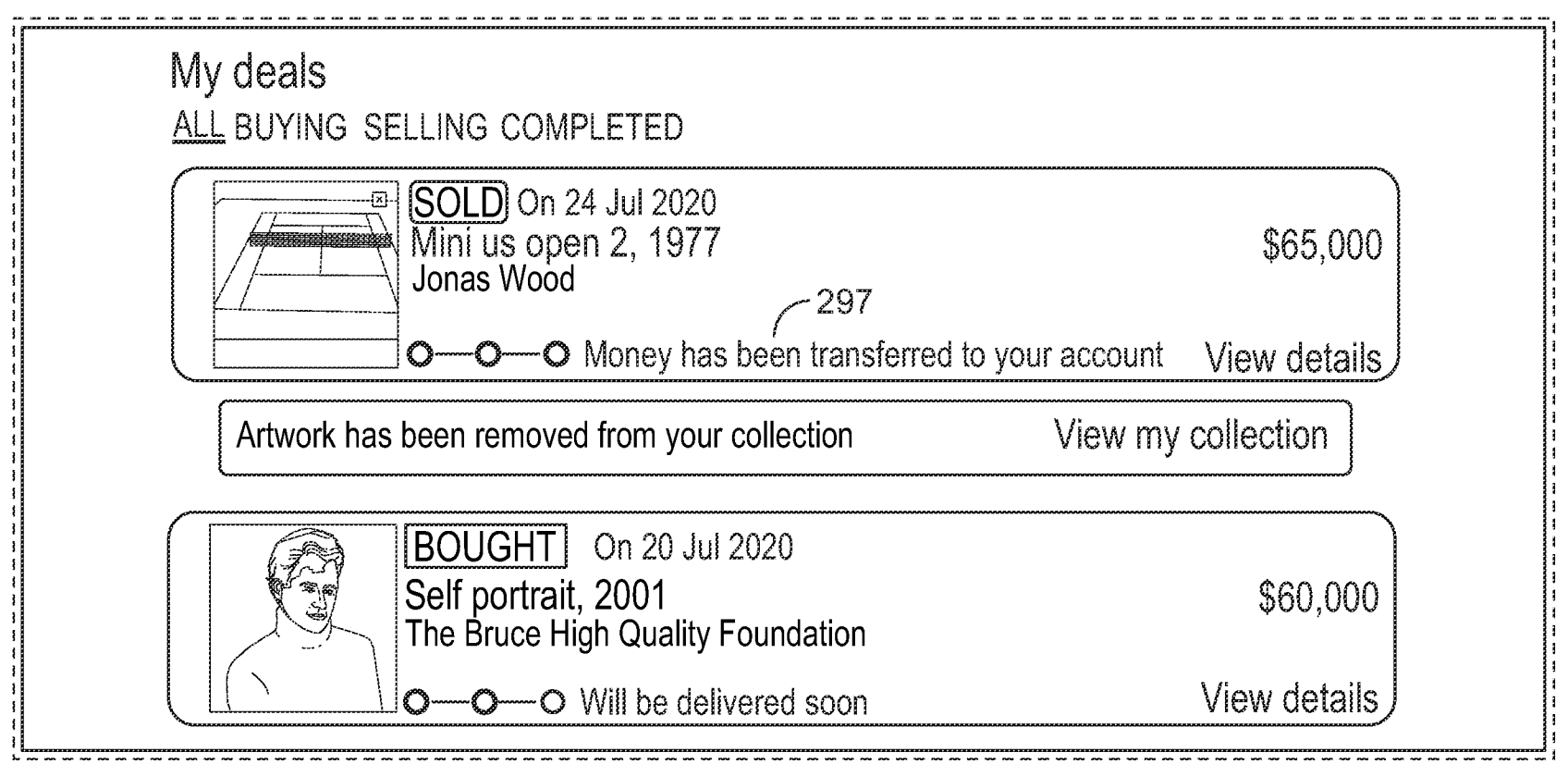

In the case in which the seller participant decides to accept the offer of the buyer participant, the user interface will present information about the completion of the sales transactions such as the progress markers 293, 295, and 297 shown in FIGS. 28, 29, and 30.

FIGS. 31 through 35 show similar pages presented to a buyer participant during the course of negotiation and completion of a sale transaction. The making of an offer is confirmed in a dialog box 279 on the page of FIG. 31 and then reported in a subpanel 282 on the page of FIG. 32. A counter offer from the buyer participant is reported in a subpanel 284 on the page of FIG. 33, and progress in the closing of the sale transaction by the indicators 302 and 304 of FIGS. 34 and 35.

Server

In some implementations, the processes (e.g., software) of the enhanced online market technology are run on one or more servers and served through the Internet or other communication network as webpages or pages of applications to be presented through user interfaces of user devices. Those processes can include the predictive model, analytical processes, market data process, transactional process, predictive pricing model process, analytical process, proxy process, similarity process, gallery presentation process, matching process, portfolio optimization process, the online adviser process, and other processes and combinations of them. These processes can be considered component of the enhanced online market technology and can be implemented in a variety of ways. The software is configured so that the processes cooperate with one another to provide the features of the enhanced online market technology and the enhanced online markets described above.

Inputs to the server processes included real-time feeds and databases of data from a variety of external sources as described earlier, and a wide variety of inputs of the participants (returned from the browsers or apps to the servers). Outputs of the server processes include elements of value performance, information drawn from the catalog, and a broad range of other outputs embedded in webpages served to the apps and browsers, for example.

One or more databases are maintained on the servers and are used to persistently store, organize, update, and deliver the information related to the catalog, the value performances, the profiles of participants and other data.

Other implementations are also within the scope of the following claims.

For example, the enhanced online market technology could be applied to present enhanced online markets for unique items that are other than artworks, for example, real estate, and luxury categories such as wine, jewelry, watches, couture fashion, cars, yachts, and expensive sneakers.

The invention claimed is:

1. A computer-implemented method comprising:
with respect to a presentation of a page that (i) is from a first source, (ii) is presented by an app or a browser, (iii) is other than a native user interface associated with an online marketplace for unique items and (iv) presents a plurality of content items including a unique item, executing, by a plug-in or browser extension, an identification process that continuously evaluates text of the plurality of content items presented by the page to identify the unique item being presented by the app or the browser on the page, the identification process being performed by the plug-in or the browser extension and being supplemental to the app or to the browser, and
in response to the identification process that is performed by the plug-in or the browser extension evaluating the text of the plurality of content items presented by the page to identify the unique item being presented on the page that is other than the native user interface associated with the online marketplace for unique items, executing, by the plug-in or the browser extension, a presentation process to present supplemental information about the unique item or about similar items to the unique item, the supplemental information having been obtained from a second source that is associated with the online marketplace and that is independent of the first source, the executing comprising:
presenting, by the plug-in or the browser extension, a window that i) is overlaid on top of the page and ii) depicts the supplemental information and a user interface control that, upon selection, causes presentation of an another state that presents a different amount of supplemental information.

2. The computer-implemented method of claim 1, wherein identifying the unique item comprises comparing the evaluated text of the page to stored information about other unique items that is known to the second source.

3. The computer-implemented method of claim 1, wherein the supplemental information comprises value performance information.

4. The computer-implemented method of claim 1, wherein the supplemental information comprises a last recorded sale price associated with the unique item.

5. The computer-implemented method of claim 1, wherein the supplemental information comprises a current, predicted price associated with the unique item.

6. The computer-implemented method of claim 5, wherein the current, predicted price is determined based at least in part on a characteristic of an auction house that last sold the unique item.

7. The computer-implemented method of claim 1, wherein the supplemental information comprises information about the similar items to the unique item, and wherein the similar items are not for sale by the online marketplace.

8. The computer-implemented method of claim 1, comprising selecting the supplemental information based on a level of a commitment that exists between an owner of the unique item and a user of the app or browser.

9. A non-transitory computer storage medium encoded with a computer program, the computer program comprising instructions that, when executed by one or more computers, cause the one or more computers to perform operations comprising:

with respect to a presentation of a page that (i) is from a first source, (ii) is presented by an app or a browser, (iii) other than a native user interface associated with an online marketplace for unique items and (iv) presents a plurality of content items including a unique item, executing, by a plug-in or browser extension, an identification process that continuously evaluates text of the plurality of content items presented by the page to identify the unique item being presented by the app or the browser on the page, the identification process being performed by the plug-in or browser extension and being supplemental to the app or to the browser, and in response to the identification process that is performed by the plug-in or the browser extension evaluating the text of the plurality of content items presented by the page to identify the unique item being presented on the page that is other than the native user interface associated with the online marketplace for unique items, executing, by the plug-in or the browser extension, a presentation process to present supplemental information about the unique item or about similar items to the unique item, the supplemental information having been obtained from a second source that is associated with the online marketplace and that is independent of the first source, the executing comprising:

presenting, by the plug-in or the browser extension, a window that i) is overlaid on top of the page and ii) depicts the supplemental information and a user interface control that, upon selection, causes presentation of an another state that presents a different amount of supplemental information.

10. The non-transitory computer storage medium of claim 9, wherein identifying the unique item comprises comparing the evaluated text of the page to stored information about other unique items that is known to the second source.

11. The non-transitory computer storage medium of claim 9, wherein the supplemental information comprises value performance information.

12. The non-transitory computer storage medium of claim 9, wherein the supplemental information comprises an invocable control for transacting the unique item.

13. The non-transitory computer storage medium of claim 9, wherein the supplemental information comprises a last recorded sale price associated with the unique item.

14. The non-transitory computer storage medium of claim 9, wherein the supplemental information comprises a current, predicted price associated with the unique item.

15. The non-transitory computer storage medium of claim 14, wherein the current, predicted price is determined based at least in part on a characteristic of an auction house that last sold the unique item.

16. The non-transitory computer storage medium of claim 9, wherein the supplemental information comprises information about the similar items to the unique item, and wherein the similar items are not for sale by the online marketplace.

17. The non-transitory computer storage medium of claim 9 comprising selecting the supplemental information based on a level of a commitment that exists between an owner of the unique item and a user of the app or browser.

18. A system comprising:
one or more processors; and
one or more non-transitory machine-readable storage devices storing instructions that are executable by the one or more processors to perform operations comprising:

with respect to a presentation of a page that (i) is from a first source, (ii) is presented by an app or a browser, (iii) other than a native user interface associated with an online marketplace for unique items and (iv) presents a plurality of content items including a unique item, executing, by a plug-in or browser extension, an identification process that continuously evaluates text of the plurality of content items presented by the page to identify the unique item being presented by the app or the browser on the page, the identification process being performed by the plug-in or the browser extension and being supplemental to the app or to the browser, and in response to the identification process that is performed by the plug-in or the browser extension evaluating the text of the plurality of content items presented by the page to identify the unique item being presented on the page that is other than the native user interface associated with the online marketplace for unique items, executing, by the plug-in or the browser extension, a presentation process to present supplemental information about the unique item or about similar items to the unique item, the supplemental information having been obtained from a second source that is associated with the online marketplace and that is independent of the first source, the executing comprising:

presenting, by the plug-in or the browser extension, a window that i) is overlaid on top of the page and ii) depicts the supplemental information and a user interface control that, upon selection, causes presentation of an another state that presents a different amount of supplemental information.

19. The system of claim 18, wherein identifying the unique item comprises comparing the evaluated text of the page to stored information about other unique items that is known to the second source.

20. The system of claim 18, wherein the supplemental information comprises value performance information.

21. The system of claim 18, wherein the supplemental information comprises an invocable control for transacting the unique item.

22. The system of claim 18, wherein the supplemental information comprises a last recorded sale price associated with the unique item.

23. The system of claim 18, wherein the supplemental information comprises a current, predicted price associated with the unique item.

24. The system of claim 23, wherein the current, predicted price is determined based at least in part on a characteristic of an auction house that last sold the unique item.

25. The system of claim 18, wherein the supplemental information comprises information about the similar items to the unique item, and wherein the similar items are not for sale by the online marketplace.

26. The system of claim 18, comprising selecting the supplemental information based on a level of a commitment that exists between an owner of the unique item and a user of the app or browser.

* * * * *